United States Patent
Taleyarkhan et al.

(10) Patent No.: US 9,348,039 B2
(45) Date of Patent: May 24, 2016

(54) DIRECTION-POSITION SENSING FAST NEUTRON DETECTOR

(71) Applicants: Rusi P. Taleyarkhan, Lafayette, IN (US); Brian Archambault, Lafayette, IN (US)

(72) Inventors: Rusi P. Taleyarkhan, Lafayette, IN (US); Brian Archambault, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 14/365,199

(22) PCT Filed: Dec. 13, 2012

(86) PCT No.: PCT/US2012/069547
§ 371 (c)(1),
(2) Date: Jun. 13, 2014

(87) PCT Pub. No.: WO2013/141910
PCT Pub. Date: Sep. 26, 2013

(65) Prior Publication Data
US 2014/0339426 A1   Nov. 20, 2014

Related U.S. Application Data

(60) Provisional application No. 61/570,210, filed on Dec. 13, 2011.

(51) Int. Cl.
| | |
|---|---|
| *G01T 5/02* | (2006.01) |
| *G01T 5/06* | (2006.01) |
| *G01T 3/00* | (2006.01) |
| *G01T 1/167* | (2006.01) |
| *G01T 5/00* | (2006.01) |

(52) U.S. Cl.
CPC ... *G01T 5/02* (2013.01); *G01T 3/00* (2013.01); *G01T 5/002* (2013.01); *G01T 5/06* (2013.01)

(58) Field of Classification Search
CPC ............... G01T 5/00; G01T 5/06; G01T 5/02; G01T 3/00; G01T 1/167
USPC ....................................... 250/353, 372, 214.1
See application file for complete search history.

(56) References Cited

U.S. PATENT DOCUMENTS

| | | | |
|---|---|---|---|
| 3,991,313 A | 11/1976 | Leschek | |
| 6,406,429 B1 * | 6/2002 | Bar-Cohen et al. | ........... 600/438 |
| 6,909,098 B2 | 6/2005 | Bross et al. | |
| 2010/0294943 A1 | 11/2010 | Frank | |
| 2011/0174990 A1 | 7/2011 | Taleyarkhan | |
| 2012/0121469 A1 * | 5/2012 | Hiller | ..................... B01J 19/008 422/117 |

* cited by examiner

*Primary Examiner* — David Porta
*Assistant Examiner* — Faye Boosalis
(74) *Attorney, Agent, or Firm* — Hahn Loeser & Parks LLP; Robert M. Gould

(57) ABSTRACT

A directional-position sensing fast neutron sensor system is disclosed. The system includes one or more acoustically tensioned metastable fluid detector (ATMFD) for determining the direction of the source of incident neutron radiation. The system has been used to detect the position of a 1 Ci Pu—Be neutron radiation source. The ATMFD detector is comparable in technical performance with directional fast neutron detector-bank technologies but is significantly more economical, smaller, and has little to no interference from nonneutron background radiation. The ATMFD detector can be used to locate hidden neutron sources and has been used in blind tests to do so. Specifically an ATMFD system (with a 6×10 cm cross-sectional area) provides directional information for incoming neutron radiation from an 8 kg Pu source from a distance of 25 m with a resolution of 11.2° at a 68% confidence within 60 seconds. Position and neutron source image sensing were also demonstrated using two ATMFDs.

17 Claims, 16 Drawing Sheets

DIRECTION-POSITION SENSING FAST NEUTRON DETECTOR

BACKGROUND

While the science and technology of radiation sensing has been under development for over a century, a well-recognized need in the art pertains to ascertaining the direction of incoming radiation, especially for neutron radiation. In particular, a critical gap exists with respect to the current inability to rapidly detect, identify and locate with confidence special nuclear materials (SNMs) from a safe distance.

Elements such as uranium and plutonium emit neutrons via spontaneous and also induced fission. Unlike other forms of radiation produced by SNMs such as gamma rays, these penetrating neutron emissions have unique signatures of fissile/fissionable material which can be used to detect and distinguish the SNMs from other radiation emitters such as Co/Cs, contaminated hospital waste or Potassium-bearing foodstuffs.

There exists a need in the art for directional neutron detection having improved detection speeds. Devices that are capable of such measurements desirably should also be able to suppress background radiation effects and should allow for the identification of the composition of the SNM neutron source itself.

SUMMARY OF INVENTION

A neutron detection system for determining the direction of the source of incident neutron radiation is disclosed. The system includes at least one microprocessor and a fluid filled chamber for detecting incident radiation. The chamber can be configured with a plurality of detecting transducers for detecting the location of bubbles within the chamber. The chamber can also be configured with acoustic transducers for establishing an acoustically tensioned metastable state within the liquid in the chamber. The detecting transducers can be configured with the chamber so that they can receive signals from bubbles within the chamber and then transmit them to a microprocessor for further processing. The detected signals are sufficient to allow the microprocessor to determine the position and/or the shape of the bubbles that form within the chamber. Alternatively, the sensors can detect light signals that occur upon implosion and collapse of the bubbles. The microprocessor can be configured with an algorithm for determining the three dimensional position or shape of the bubbles in the chamber.

The acoustic transducers can be configured with the chamber to introduce a sound wave into the liquid in the chamber. The sound wave must be sufficient to create an acoustic metastable state in the liquid such that bubbles form upon exposure to incident neutron radiation. The acoustic metastable state can be introduced in response to a signal from a microprocessor and, in an embodiment, an amplifier. The system also includes a microprocessor that can identify the direction of the source of incident neutron radiation, if present, from the bubble signals.

In an embodiment the microprocessor for identifying the direction of the source of the incident neutron radiation can determine the track of the bubbles through the chamber fluid, the origin of the bubbles indicating the direction of the source of the neutron radiation. In an alternate embodiment, the microprocessor for identifying the direction of the source of the incident neutron radiation can determine the density of bubble events within the chamber fluid, the denser portion of the gradient being in the direction of the source of the neutron radiation.

In an embodiment the neutron detection system of claim 1 can be spherical which can facilitate obtaining the direction of the neutron source in three dimensions. In an embodiment the neutron detection system includes at least two hemispherical-capped, cylindrical chambers to facilitate obtaining three-dimensional directional information.

In an embodiment the system can include a linear amplifier for sending the acoustic signal to the acoustic transducers and the signal can be a sinusoidal sound wave with respect to the liquid in the chamber.

The system can be used to determine the direction of incident radiation by applying an acoustic sound wave to induce tension in the fluid in the chamber such that incident neutron radiation causes bubble formation within the fluid. The bubbles are then detected by the detecting transducers which send a signal to a microprocessor which then determines the direction of the source of a neutron emitting radiation source in the area. Multiple systems or detection chambers can be used to facilitate obtaining directional information. The signals that can be detected from any bubbles formed within the fluid in the chamber include light signals emitted from collapsing bubbles, bubble shapes which tend to be elongated and travel away from the radiation source, and audible sounds caused by bubble collapse. These signals can be processed by a microprocessor to provide the direction of a neutron radiation source.

The disclosed system is nearly completely or completely insensitive to gamma photons and also to background cosmic radiation. It can be used to detect neutrons over 8 orders of magnitude in energy and requires no cooling or heating of the fluid contained in the chamber.

FIGURES

FIG. 1 provides a diagram of one embodiment of the ATMFD detector.

FIG. 2 provides an illustration of signal detection from four transducers on an oscilloscope.

FIG. 3 provides a diagrammatic illustration of the geometric configuration that can be used to calculate the distance from any position in the detector to the wall of the detector in a two dimensional polar coordinate system.

Figure 9:
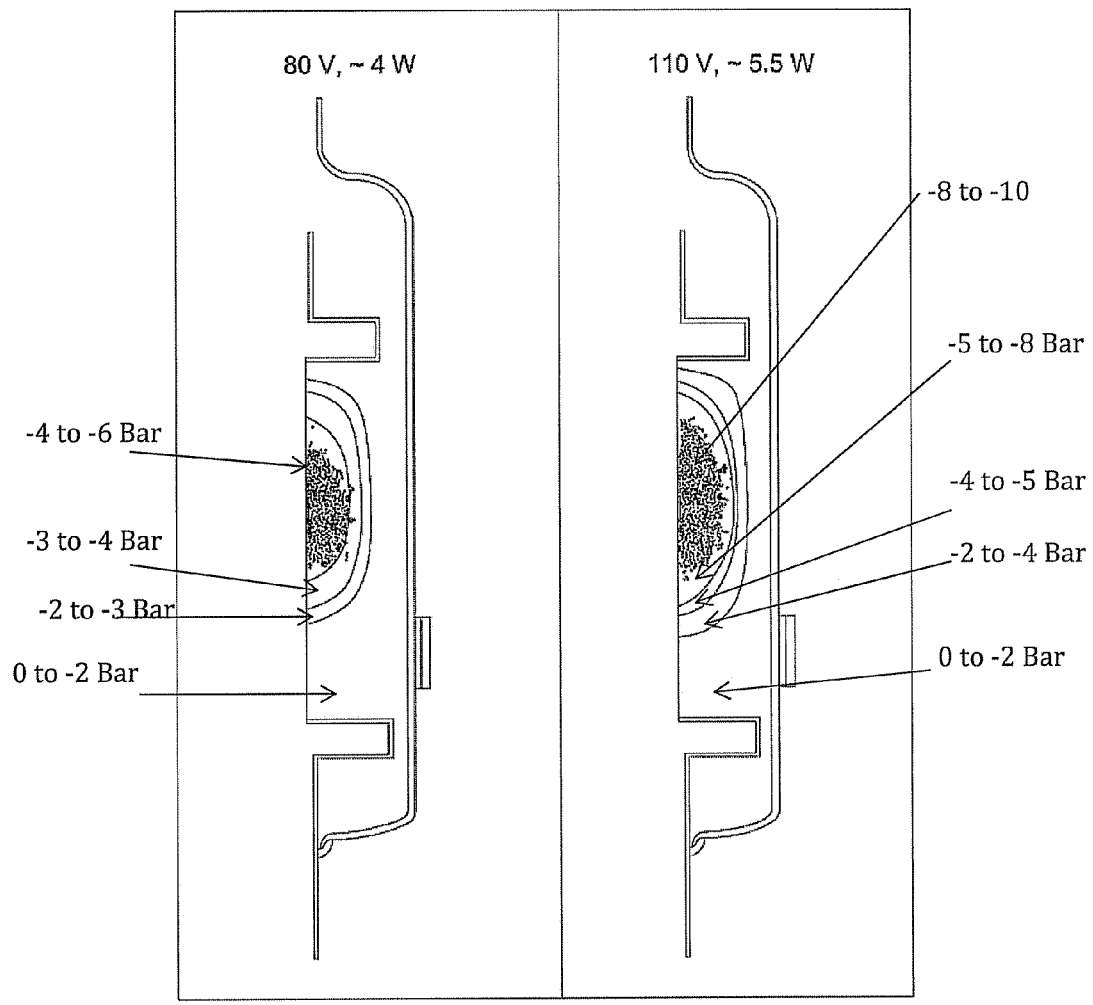

FIG. 9 provides a visual representation of the relationship between variations in the drive power applied to the PZT and the spatial characteristics of the sensitive volume of the chamber at the resonant frequency of 18.78 kHz.

Figure 10:
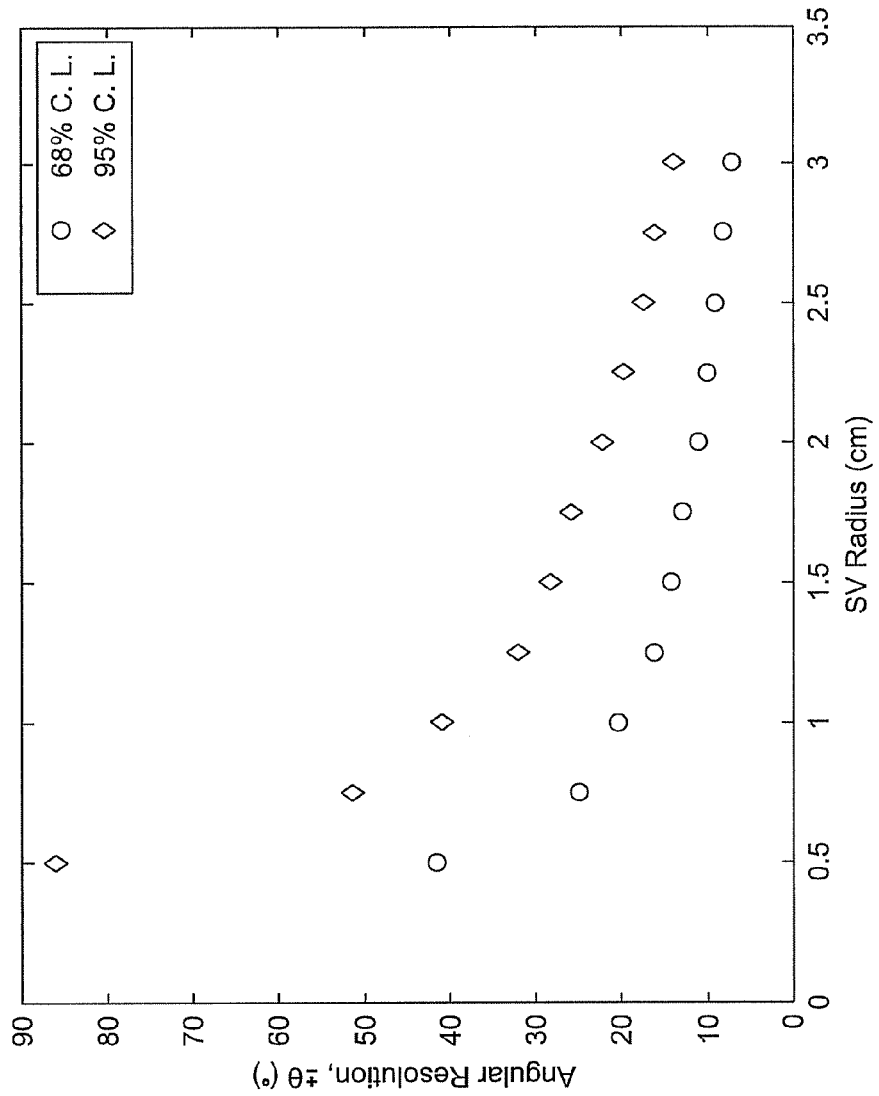

FIG. 10 illustrates that as the radius of the sensitive volume increases, the angular resolution rapidly approaches the maximum possible angular resolution of 0° with the same total number of neutron detection events recorded.

Figure 11:
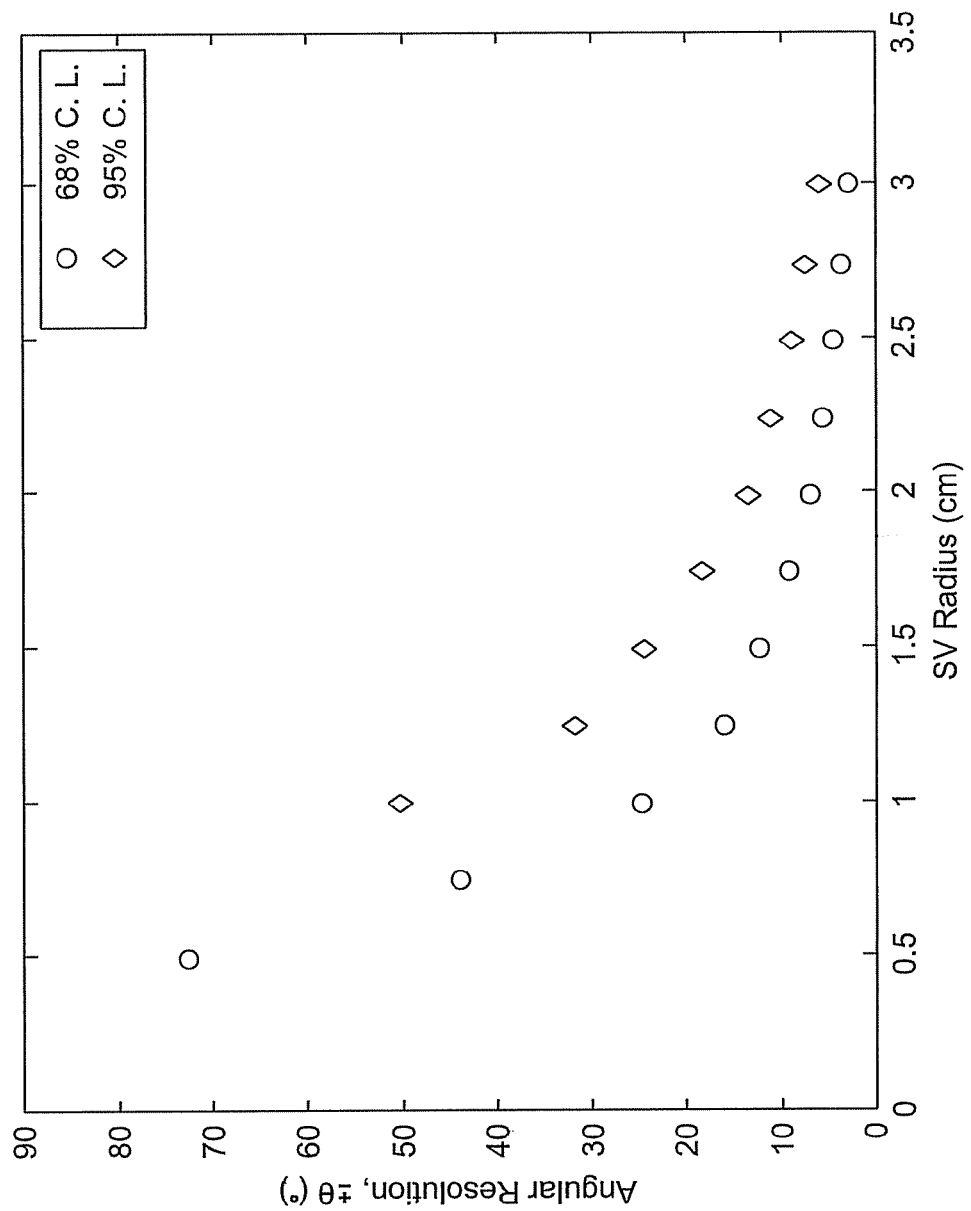

FIG. 11 illustrates the relationship between increased efficiency and the number of detection events recorded in the ATMFD chamber for the same number of source neutrons.

Figure 12:
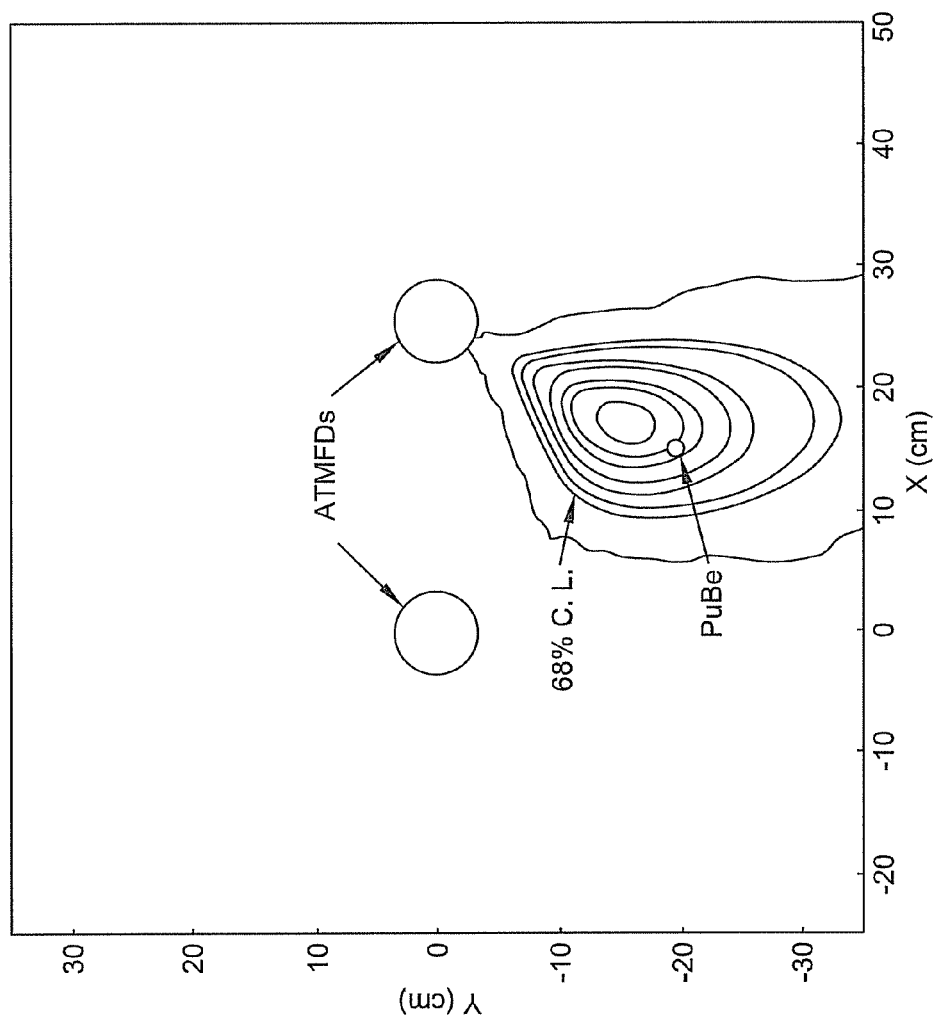

FIG. 12 illustrates the results of a simulated, two dimensional, detection using two ATMFD detectors.

Figure 13:
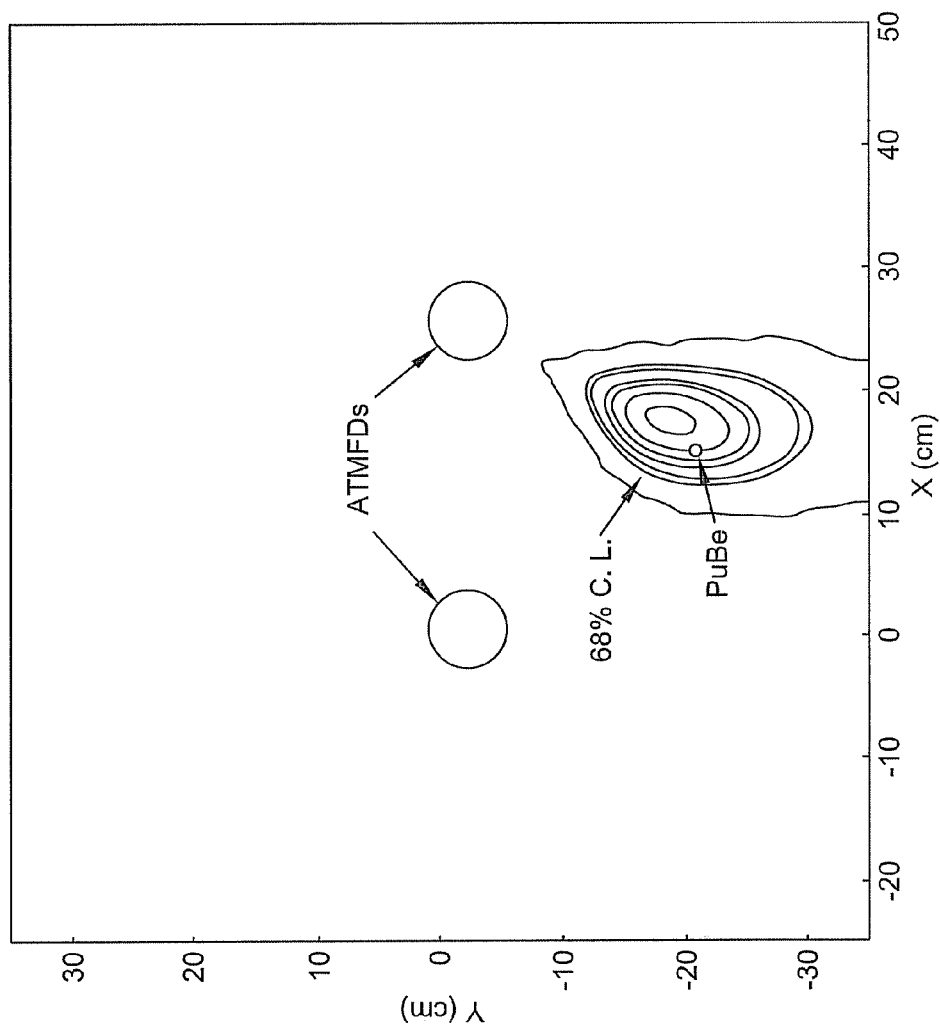

FIG. 13 illustrates the results of a simulated two dimensional detection using two ATMFD detectors.

Figure 14:
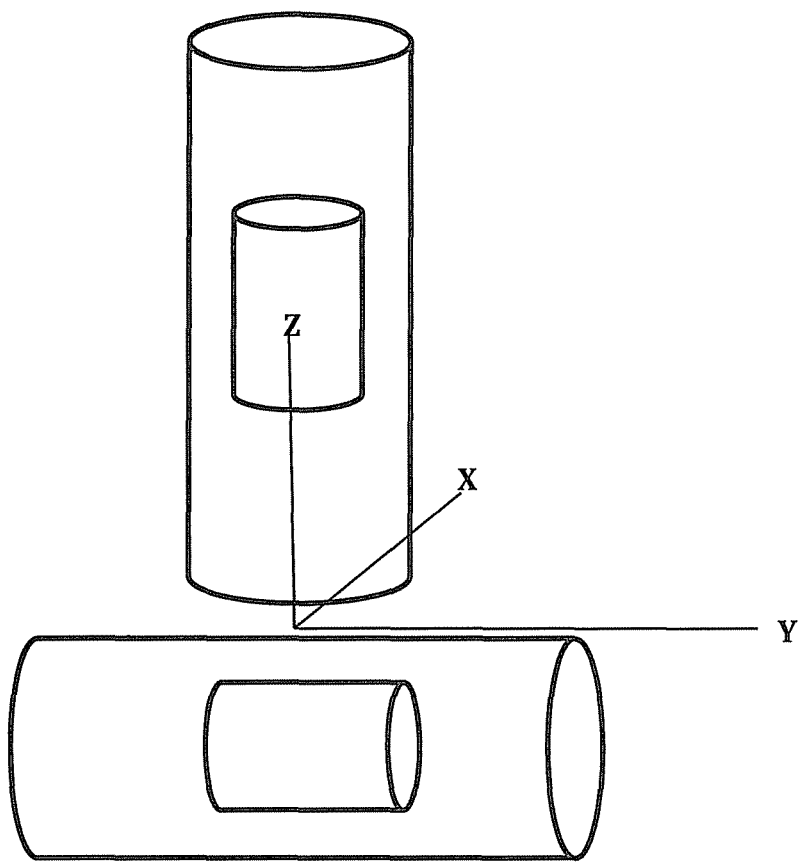

FIG. 14 is a diagram of the orientation of two cylindrical ATMFD elements for attaining 4π directionality.

Figure 15:
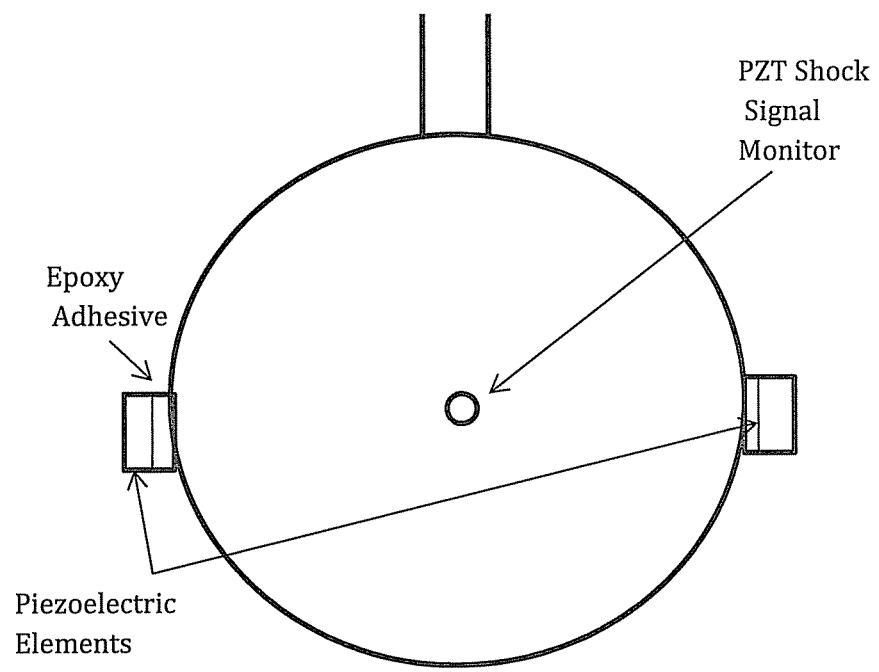

FIG. 15 is a schematic diagram of a spherical ATMFD system for use in 4π detectors.

Figure 16:
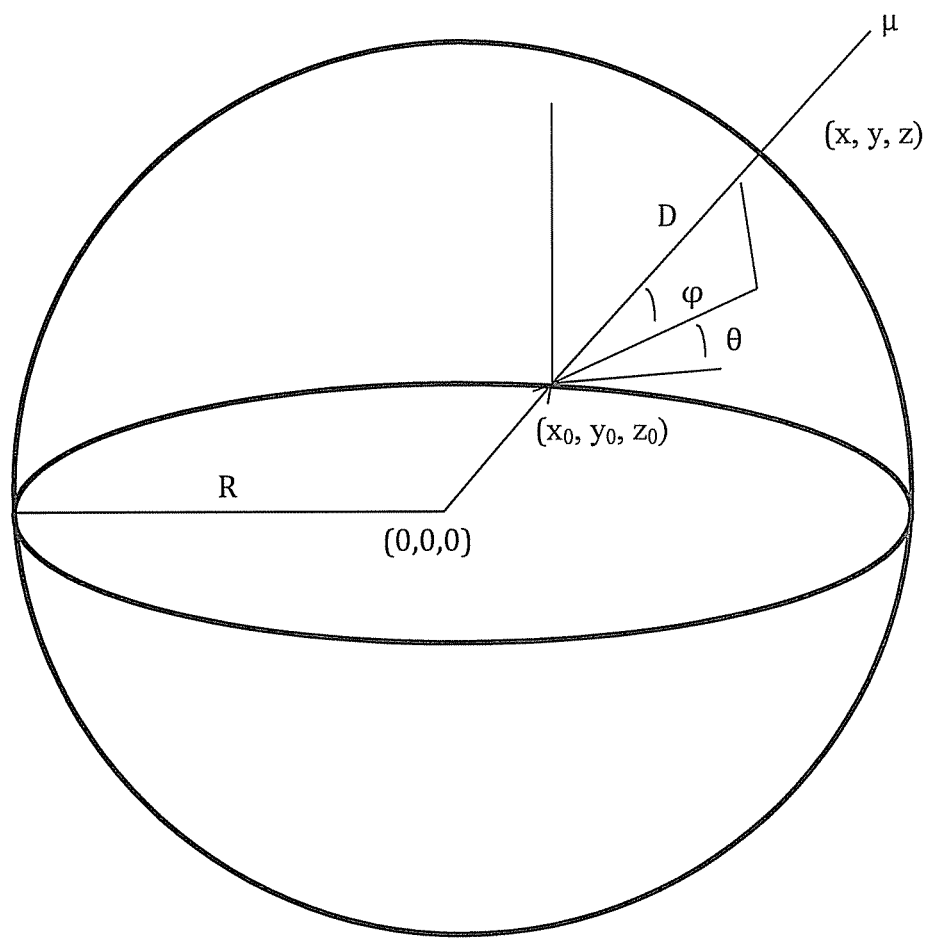

FIG. 16 illustrates a three dimensional diagram of a 4π coordinate system used in the 4π spherical ATMFD.

DETAILED DESCRIPTION OF INVENTION

Abbreviations used in this specification are as follows:
ATMFD is an Acoustically Tensioned Metastable Fluid Detector
SNMs are special nuclear materials
RTV is room temperature vulcanization
MCNP is Monte Carlo nuclear particle transport code
PZTs are a piezoelectric transducers
C.L. means Confidence Limit Neutron detection systems that can determine the direction of incident radiation are disclosed. The disclosed systems are capable of rapidly and reliably detecting and identifying problematic quantities of special nuclear materials (SNMs) at a safe distance. Specifically, elements such as uranium and plutonium that emit neutrons via spontaneous and also induced fission can be detected. Unlike other forms of radiation produced by SNMs such as gamma rays, these penetrating neutron emissions have unique signatures of fissile/fissionable materials that can be detected and distinguished from other radiation emitters such as cobalt/cesium, contaminated hospital waste, or potassium-bearing foodstuffs.

The disclosed directional radiation detector systems provide improved detection speeds compared to known proximity searching devices. They also provide the most powerful means for suppression of background radiation effects and can be used to identify the composition of the SNM neutron source itself.

In one embodiment the directional neutron detector system is an Acoustically Tensioned Metastable Fluid Detector (ATMFD). In this system a single ATMFD has been shown to be capable of detecting neutrons over 8 orders of magnitude in energy with over 90% intrinsic efficiency. Certain embodiments operate with nearly complete or complete insensitivity to gamma photons, and non-neutron cosmic background radiation and can be used to provide directional information as to the location of fast neutron emitting sources. This is accomplished with significant cost reduction over other known detection systems.

Figure 1:
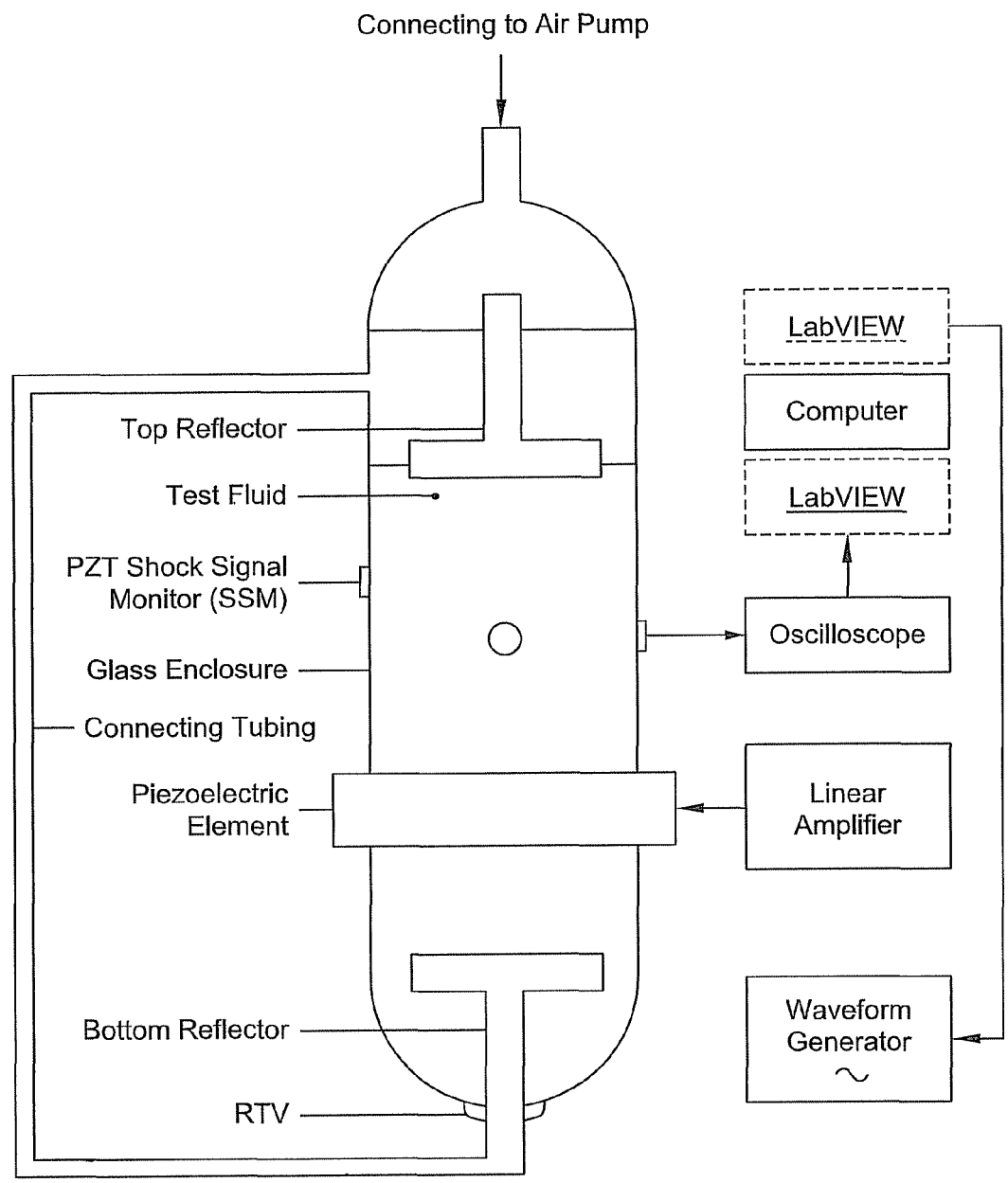

The ATMFD system uses acoustic waves to introduce tension on fluids in a detector chamber. Suitable detection chambers can provide signals in two or three dimensions. The ATMFD chamber can be any suitable shape so long as it is capable of providing directional infatuation as described herein. For example, as illustrated in FIG. 1 the ends of the chamber can be hemispherical and the body of the chamber can be cylindrical. Alternatively, the chamber can be spherical.

Multiple chambers can be used to provide three-dimensional directional information as to the source of incident neutron radiation. Spherical detectors can also be used to obtain three-dimensional information.

The chamber fluid can be at or near room temperature for use. However, any temperature can be used so long as the bubble events in the detector occur frequently enough to obtain the desired directional information. Thus, temperatures above the freezing point and below the boiling point are also envisioned.

The introduction of a tensioned metastable state in the chamber fluid creates a metastable condition in the fluid in which transient bubbles can form when incident ionizing neutron radiation passes into the fluid. Tension in fluids is believed to be analogous to the stretching of solid structures. The excess energy required to tear apart the intermolecular bonds to cause rupture of a solid decreases as the structure is stretched. In an analogous manner, it is believed that the energy required to break the bonds between liquid molecules decreases with increasing tension thereby allowing bubbles to form when radiation of a suitable energy impinges on the nuclei in the fluid. For the case of fast neutrons this energy is thought to be provided via the elastic scattering interaction between the neutron and the atomic nuclei in the fluid. The energy deposited by the neutron to a fluid atom's recoil nucleus is thought to create an ionized particle which is then thought to deposit energy into the fluid via Coulombic and nuclear collision interactions. The energy deposition from the recoil ions is believed to manifest itself into thermal energy that is deposited over several nanometers causing a vapor pocket to form. The range in which this energy is deposited is thought to depend on the stopping power of the recoil ion in the liquid. If the thermal energy deposition is high enough to cause a vapor nucleus of a sufficient size the nucleus will continue to grow from a nanoscale into a transient vapor bubble that is both visible and that can be heard audibly. Therefore, the selective sensitivity for detection of radiation in an acoustically tensioned metastable fluid detector is thought to be based on a combination of the level of tension imparted into the fluid and the value of spatial energy deposition (dE/dx) either directly or indirectly produced from given incident ionizing radiation.

Directional Acoustic Tension Metastable Fluid Detector

The acoustic tension metastable fluid detector chamber can be of any suitable size and dimension that can reliably measure the incidence and direction of incoming radiation. For example, a chamber having an outside diameter of about 70 mm and 150 mm in length in a cylindrical tube and having a wall thickness of about 3 mm can be used. Larger or smaller chambers can also be used. Chambers can range in size from about 10 mm diameters to about 5-10 cm diameters or more can be used and chambers can be from about 10 mm in length to about 15 cm in length or longer, for example. There is actually no size limit to the chamber that can be used. It is only limited by the requirement for being able to introduce a tensioned metastable state within the liquid in its interior and the ability to detect bubble formation in response to incident neutron radiation.

The ATMFD can be any suitable shape so long as it is capable of providing directional information as described herein. For example, as illustrated in FIG. 1 the ends of the chamber can be hemispherical and the body of the chamber can be cylindrical or it can be spherical.

The ends can be attached to the cylinder by any means that allows for the creation of fluids having a suitable tension. For example, room temperature vulcanization (hereinafter "RTV") silicone can be used. However, fused glass and ceramic or metallic structures can also be used. A schematic of one embodiment of the ATMFD is shown in FIG. 1.

The chamber can be made of any material that can withstand the vacuum used in the chamber and that can accommodate an acoustic standing wave and acoustical tensioned fluids in its chamber. One such material is quartz. Acoustic energy in resonance mode can be focused utilizing a hollow quartz reflector placed at opposing ends of the fluid-filled chamber. Although quartz can be used, any material having sufficient strength and response properties can be used to contain the acoustically tensioned fluids so long as they do not block the incident neutron radiation.

A device for introducing a acoustic wave, preferably a standing wave, can be attached to the chamber or positioned such that the chamber fluid reaches a tensioned metastable state. This can be accomplished by positioning one or more acoustic transducers on the exterior surface such that the acoustic sound wave is carried through the chamber walls, into the detector fluid. There can be a transducer such as a ring shaped piezoelectric ceramic transducer which can be concentrically affixed to the outside of the chamber by any method that allows the transducer(s) to pass the acoustic wave into the fluid of the chamber and is used to power the acoustic resonance chamber. A sinusoidal signal amplified by a linear amplifier can be used to drive the transducer. The signal can be polarized in the radial direction. When in resonance, the mechanical deformations of the chamber generate a standing acoustic wave consisting of oscillating positive and negative (i.e., sub-vacuum or below zero) pressures at about 20 kHz. During the time the fluid molecules are under tension, the state is metastable whereupon, neutron direct knock-on strikes can nucleate transient bubbles that produce detectable signals that can be monitored.

In an embodiment the detector can be filled with approximately 99.9% pure acetone ($C_3H_6O$). However, any fluid that can be put under sufficient tension to produce bubbles in response to incident neutron radiation can be used. The detector chamber can be maintained and used at about 25° C. and placed under more than 500 mm Hg of vacuum. The chamber can be operated with a wave-form generator such as Agilent model 33120A and a linear amplifier such as the Piezo Systems, Inc. model EPA-104. The resonant frequency for the detector can be found by any convenient means. For the detector described above the resonant frequency was about 18.3 kHz and the drive voltage used was about 96 V for an average input power of about 4.5 W. A digital storage oscilloscope, such as Agilent model 54624A can be used to record shock traces caused by the violent release of stored energy occurring immediately following a neutron detection event, ie., bubble implosion.

Transducers can be used to detect the location of bubbles. For example, four MHz response piezoelectric transducers can be affixed to the outside of the resonant chamber to record shock traces caused by bubbles. Any transducer can be used so long as they are able to detect the bubble events. For example, 7 mm OD transducers can be used. The electrical signals recorded from the piezoelectric transducers can be sent through a filter to eliminate the dominant acoustic drive frequency therefore isolating the high frequency components for directionality determination. For example, a third order Butterworth high pass filter can be used. An example of actual signal detection is shown on the oscilloscope tracing shown in FIG. 2.

In embodiments having four transducers, three of the transducers can be placed at angles to each other on the same XY plane. The fourth transducer can be placed with a displacement in the Z axis. The time difference of arrival of the shock traces at each transducer can be measured and analyzed with a microprocessor programmed with a hyperbolic positioning algorithm to calculate the exact three dimensional location of the neutron detection event in the detector chamber.

Reliable and accurate measurement of the time difference of arrival can be accomplished using two statistical algorithms. The first cut is based on a measure of the symmetry, or skewness, of the shock signal. Every shock signal exhibits a distinct symmetric high frequency (about 250 kHz) sinusoidal pulse shape. A threshold skewness level is utilized to eliminate false positives originating from both mechanical and electrical noise. The second algorithm is based on the cross-correlation between two of the shock signals. A shock signal originating from the same detection event (i.e., from the specific imploding bubble) has been found to induce a similar transient history and exhibits a similar voltage time pattern on each transducer. A measure of the cross-correlation between two of the transducers allows for validation of a true detection event, as well as, an accurate measurement of the time difference of arrival between transducers. Error analysis by the data acquisition system can be used to locate the neutron detection event with a spatial resolution of about 100 µm. The controlled operation of the oscilloscope, data collection, and signal processing and analysis are performed with a LabVIEW® based microprocessor in near real time (i.e., within milliseconds). Microprocessor-based data gathering can be facilitated with the storage oscilloscope using a GPIB interface, such as National Instruments model 777158-01. Such a system limits data collection to about 3 Hz due to its limitations. However, other more powerful systems that can integrate PCI-based analog data acquisition systems are envisioned that can readily and significantly increase data acquisition rates to near-real time.

Ascertaining Directionality of Incoming Radiation

Directional information can be obtained in the ATMFD system due to the increased probability that a neutron induced detection event will occur in the region of the sensitive fluid volume nearest the source. The probability that a neutron induced detection event will occur is a function of the negative pressure in the detector fluid and the neutron flux. Due to the chiefly axi-symmetric nature of the construction of the cylindrical ATMFD resonant chamber, the probability of a neutron detection event can be simplified by treating it as a function of the neutron flux alone. The uncoupling of the dependence of the probability of a neutron detection event with the negative pressure allows quantitation in a manner that provides directional information on the location of the neutron source in a planar (i.e., $2\pi$) based fashion solely on the magnitude and energy of the neutron flux.

A spherical ATMFD system is also envisioned that would exhibit symmetry in both polar and azimuthal angles. The symmetrical construction of such a system would provide for the uncoupling of the dependence of the probability of a neutron detection event with the negative pressure, thereby facilitating the creation directional information (i.e., in $4\pi$).

Since neutron flux from a source decreases with distance and with the degree of down scattering and absorption, the side of the sensitive volume nearest the source naturally has the highest probability of interaction locations, and therefore, for the formation of an increased number of transient bubbles. Detecting the location of these events inside the detector provides for ascertaining information on the direction of the neutron source. A simplified 1D model illustrates the functioning of the ATMFD system to ascertain directional information on the location of an external neutron source and is described in the following section.

Simplified 1D Theoretical Model

The neutron flux within the sensitive volume of the ATMFD is a function of both the solid angle between the neutron source and the ATMFD and the absorption and down scattering of the neutrons within the detector fluid itself. The effects of the solid angle between the neutron source and the sensitive volume of the ATMFD can be quantified by comparing the flux at opposite sides of the detector. The sensitive volume of the ATMFD may be represented as a cylinder of radius r at the center of the detector. The entire sensitive volume can then be divided into two halves; one half facing the neutron source ($V_1$) and one half facing away from the neutron source ($V_2$). Assuming the average flux in each regional sensitive volume occurs at the center of each respective volume, the direction of the neutron source may be determined by comparing the neutron flux in each respective volume as, $$\frac{\phi_1}{\phi_2} = \left(R + \frac{r}{2}\right)^2 / \left(R - \frac{r}{2}\right)^2$$

where, R is defined as the distance between the neutron source and the center of the ATMFD chamber.

At large source to detector distances the solid angle based neutron flux ratio decreases rapidly and as $R \to \infty$ the neutron flux ratio $\phi_1/\phi_2 \to 1$. Therefore, a detector only dependent on solid angle effects would lose its utility for directionality determination for most cases of practical interest. Fortunately, the down scatter contributions of the detector fluid itself also contribute to the ATMFD's directional capabilities.

The excess energy required to trigger phase change of molecules in a tensioned metastable fluid is provided via the elastic scattering interaction between fast neutrons and the atomic nuclei. The energy deposited by the neutron is dependent not only on the scattering angle (which is energy independent), but importantly, on the initial neutron energy itself. Therefore, the probability of detection of a fast neutron is primarily proportional to the neutron energy. For a simplified 1D model only the uncollided neutron intensity is considered. As before, the sensitive volume of the ATMFD may be modeled and represented as a cylinder of radius of r along the center line of the detector. The entire sensitive volume is then divided into two halves; one half facing the neutron source ($V_1$) and the other half facing away from the neutron source ($V_2$). Utilizing the exponential attenuation law, the average uncollided neutron intensity in each regional sensitive volume can be calculated to determine the direction of the neutron source by comparing the difference in the average uncollided neutron intensity in each respective volume as, $$\frac{I_1}{I_2} = I_0 e^{-\Sigma\left(\frac{d}{2} - \frac{r}{2}\right)} / I_0 e^{-\Sigma\left(\frac{d}{2} + \frac{r}{2}\right)} = e^{\Sigma r}$$

where, d is the diameter of the detector, and $\Sigma$ is the macroscopic scattering cross-section.

The effects of downscattering on the uncollided neutron intensity and therefore the amount of directional information available are exponentially related to both the macroscopic cross section and the radius of the sensitive volume. The simplified 1D theoretical model presented here forms the basis for a more sophisticated stochastic-based model developed for ascertaining directionality in $2\pi$.

Ascertaining for Directionality in $2\pi$

Analogous to the 1D theoretical model, the neutron attenuation law may be utilized to estimate the probability that a detected neutron had originated from any given direction based on the detection location. This can be accomplished by first considering the probability P that a neutron traverses a distance, d, in the detector fluid without interacting and then interacts within the distance $\delta d$ per the following expression:

$$P(d, \delta d) = P_{non\text{-}reaction}(d) * P_{reaction}(\delta d)$$

Figure 3:
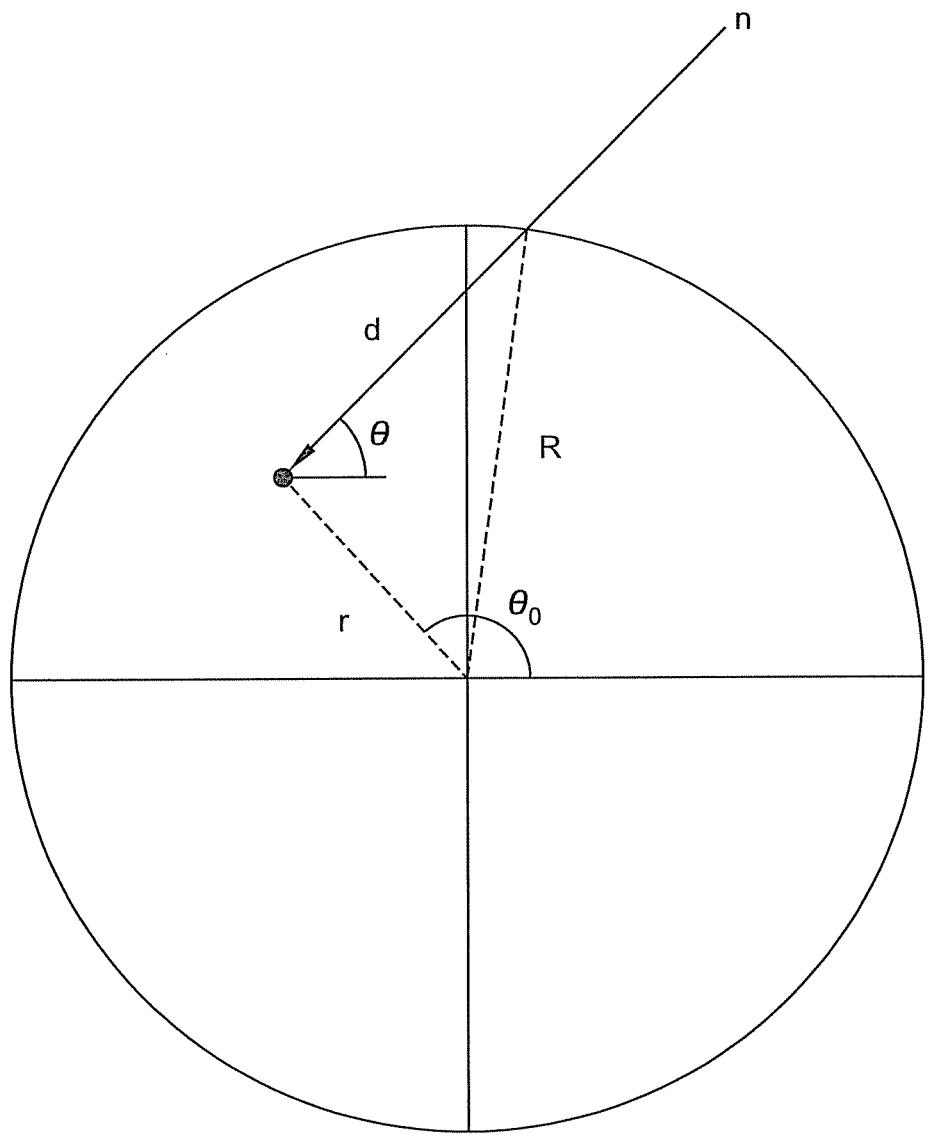

The distance from any position in the detector to the wall of the detector, as defined in the 2D polar coordinate system shown in FIG. 3, may be calculated as follows:

From the law of cosines, $$R^2 = r^2 + d^2 - 2rd\cos(\theta + \pi - \theta_0)$$

Rearranging yields a quadratic equation comprised of the variable d of the following form:

$$d^2 - (2r\cos(\theta + \pi - \theta_0))d + (r^2 - R^2) = 0$$

Solving gives the expression for d as, $$d = r\cos(\theta + \pi - \theta_0) \pm \sqrt{r^2\cos^2(\theta + \pi - \theta_0) - r^2 + R^2}$$

Since r<R and d must remain positive, only the positive root must be taken. Therefore the distance from any position in the detector to the wall of the detector in the direction, $\theta$, is as follows:

$$d = r\cos(\theta + \pi - \theta_0) + \sqrt{r^2\cos^2(\theta + \pi - \theta_0) - r^2 + R^2}$$

Therefore the probability that the neutron originated from the direction, $\theta$, and interacted at the position (r,$\theta$0) is given by $$P(\theta) = e^{-\Sigma d}(1 - e^{-\Sigma \delta d})$$

where $\delta d$ is the spatial resolution of the detector of about 0.1 mm for the detector described above having a chamber with an outside diameter of about 70 mm and 150 mm in length in a cylindrical tube and having a wall thickness of about 3 mm.

Each individual neutron detection event probability distribution is normalized by numerical integration via composite trapezoidal rule. The probability distribution of n detection events is then calculated as the product of the probability distribution of every individual detection event as shown in the following equation:

$$P_{Tot}(\theta) = \prod_{i=1}^{n} P_i(\theta)$$

The total angular probability distribution can be normalized by numerical integration using the composite trapezoidal rule. The radioactive source can then be determined to be located at the most probable angle, and confidence levels, if desired, can be calculated by numerical integration of the total angular probability distribution.

ATMFD Experiments for Neutron Directionality

Figure 4:
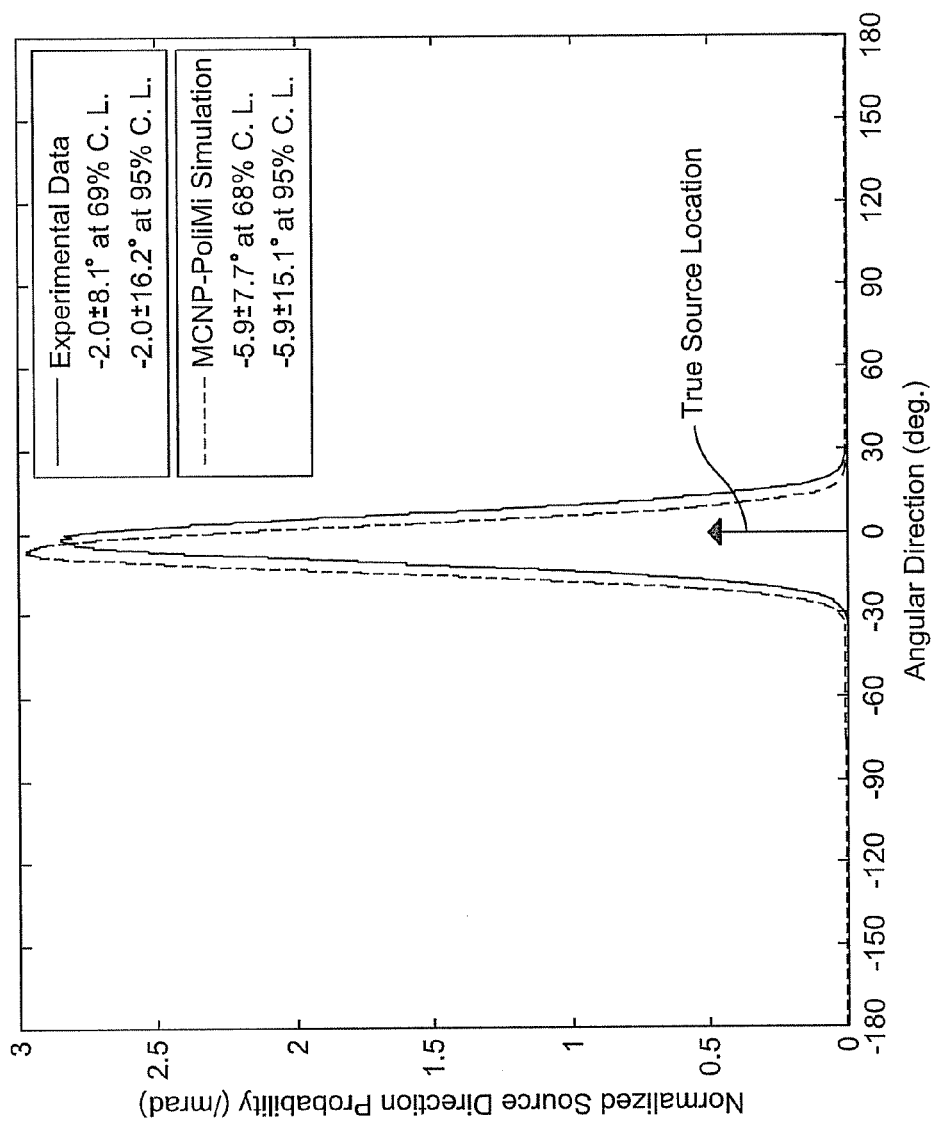
FIG. 4 illustrates theoretical and experimental data for a 1 Ci Pu—Be isotope neutron-gamma source emitting $2 \times 10^6$ n/sec positioned at an angle of 0° and distance of 80 cm from the ATMFD.

Experimental data were acquired with a 1 Ci Pu—Be isotope neutron-gamma source emitting $2 \times 10^6$ n/sec positioned at an angle of 0° and distance of 80 cm. This resulted in the formation of over 5-10 transient bubbles per second. Data recorded (with the 3 Hz equipment mentioned earlier) for approximately 10 minutes resulted in the collection of about 2000 valid detection events. Analysis of the experimental data determined the neutron source to be located at an offset angle of −2.0°, which corresponds to a bias ascribed to glassware asymmetry of the ATMFD, but nevertheless, with an angular resolution of ±8.1° with a confidence level of 68%, and ±16.2° with a confidence level of 95%. The results are shown graphically in FIG. 4.

Figure 5:
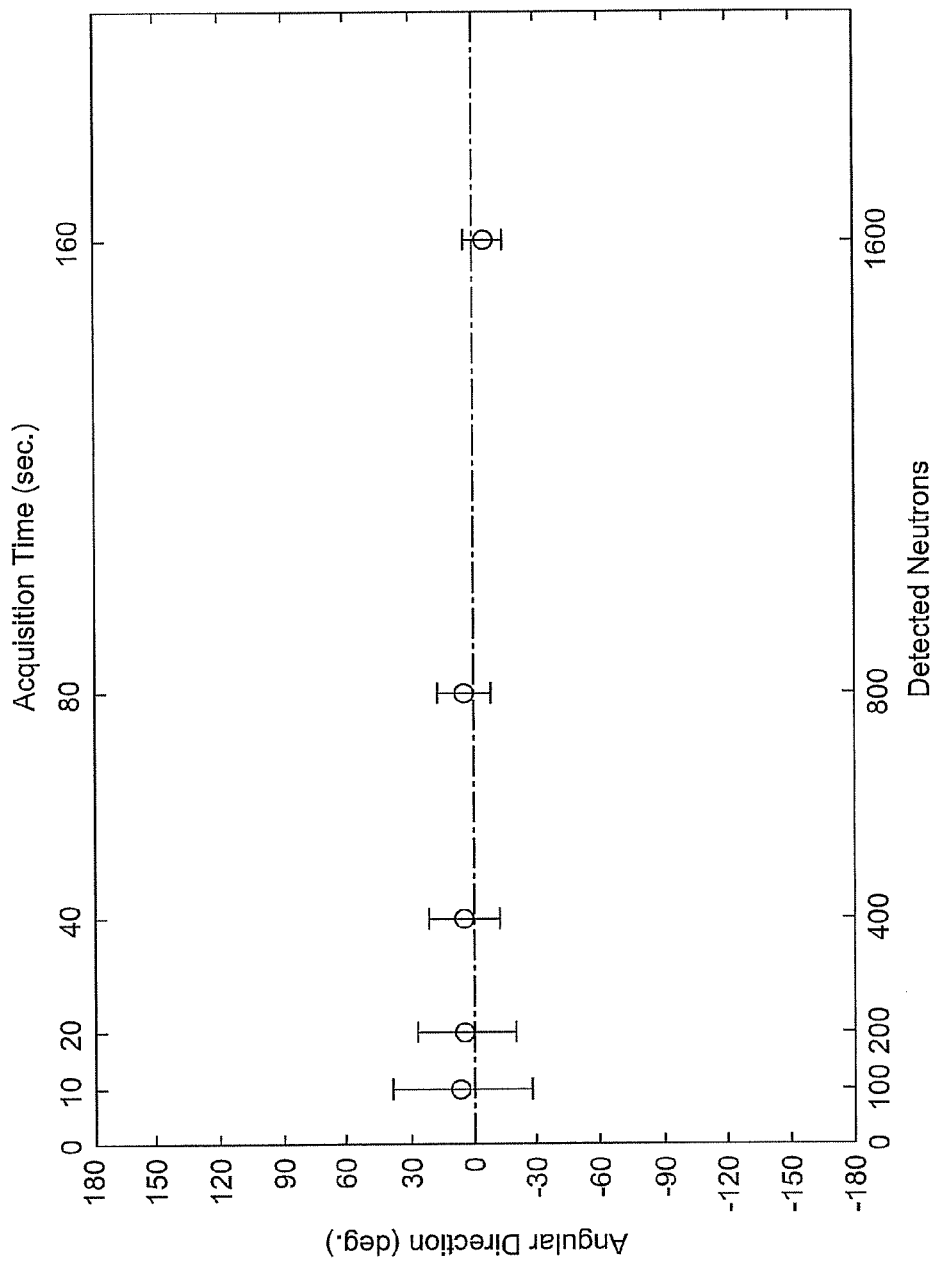
FIG. 5 illustrates the angular resolution of the ATMFD as a function of the number of detected neutrons and acquisition time.

In this experiment the ATMFD system successfully located a 1 Ci Pu—Be neutron source at a distance of 80 cm to within 8.1° with 68% confidence with the acquisition of about 2,000 detection events which could be collected within about 200 s at an actual occurrence rate of about 10 per second. This represents a substantial reduction, of about 22-fold, in the search space when compared to a non-imaging detector. As can be appreciated the angular resolution achievable with the ATMFD system increases considerably as the neutron detection events increase in number. This is illustrated in FIG. 5 where the angular resolution of the ATMFD is shown as a function of the number of detected neutrons and acquisition time. For example, within 10 sec and the acquisition of only 100 neutron detection events, the search space has already been reduced by a factor of 6.

To test whether radial symmetry of the ATMFD system results in more uniform resolution at all angles, the detector was used to locate a neutron source at angles of −180°, −90°, and 90°. As predicted, the angular resolution was found to be uniform and independent of source positioning.

Figure 6:
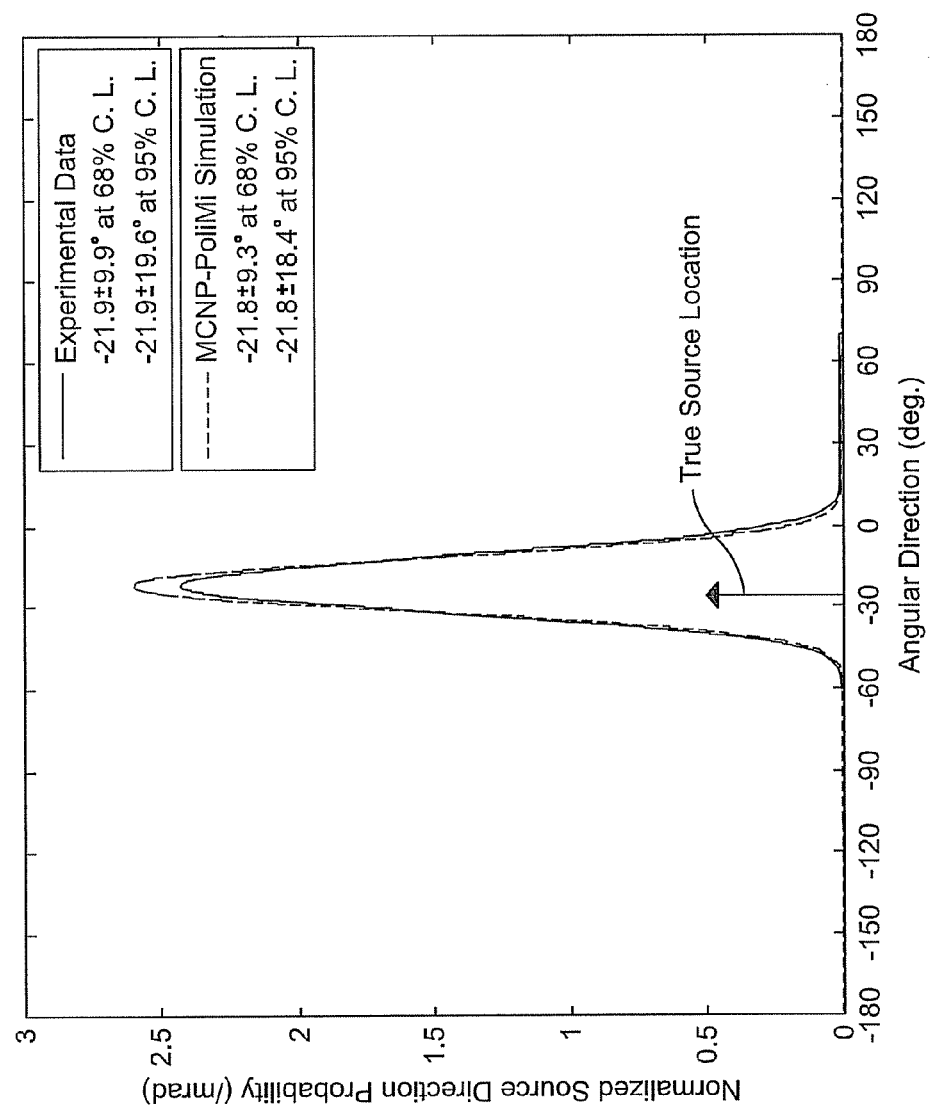
FIG. 6 illustrates experimental and theoretical data for a neutron source located at an angle of −21.9° at 43 cm.

To test the ability of the directional ATMFD system to locate a neutron source at an unknown location, the Pu—Be neutron source was hidden, in a blind test, in one of three cardboard boxes. As before, data recorded for approximately 10 minutes resulted in the collection of about 2000 neutron detection events. Analysis of the experimental data predicted the neutron source to be located at an angle of −21.9° with an angular resolution of ±9.9° with a confidence level of 68% and ±19.6° with a confidence level of 95%. The results are shown in FIG. 6. The Pu—Be source was actually placed at an angle of −25° and at a distance of 43 cm, which is well within the 68% confidence level of the predicted direction of −21.9°.

MCNP-PoliMi Simulations of ATMFD System for Neutron Directionality Determination A 3-D Monte Carlo neutron transport model has also been developed to further investigate the directional capabilities of the ATMFD system. The U.S. Department of Energy-sponsored Monte Carlo nuclear particle transport code, MCNP, was utilized to evaluate the spatial and energy dependent physical aspects affecting the neutron transport and energy spectrum over the sensitive three dimensional volume of the ATMFD. The model consists of the ATMFD's resonant chamber and a 1 Ci Pu—Be neutron source (emitting about $2 \times 10^6$ n/s) at a distance of 80 cm from the central axis of the chamber. All structural materials including the reflectors made of quartz, the piezoelectric transducers made of lead zirconate titanate (PZT), and the detector fluid acetone ($C_3H_6O$) were represented. The portion above the top reflector, inside the top and bottom reflectors and outside the chamber is modeled as air. The composite scoping model incorporates the main features of the ATMFD system and the intervening material, but not laboratory walls, floor, ceiling or biological shielding.

Figure 7:
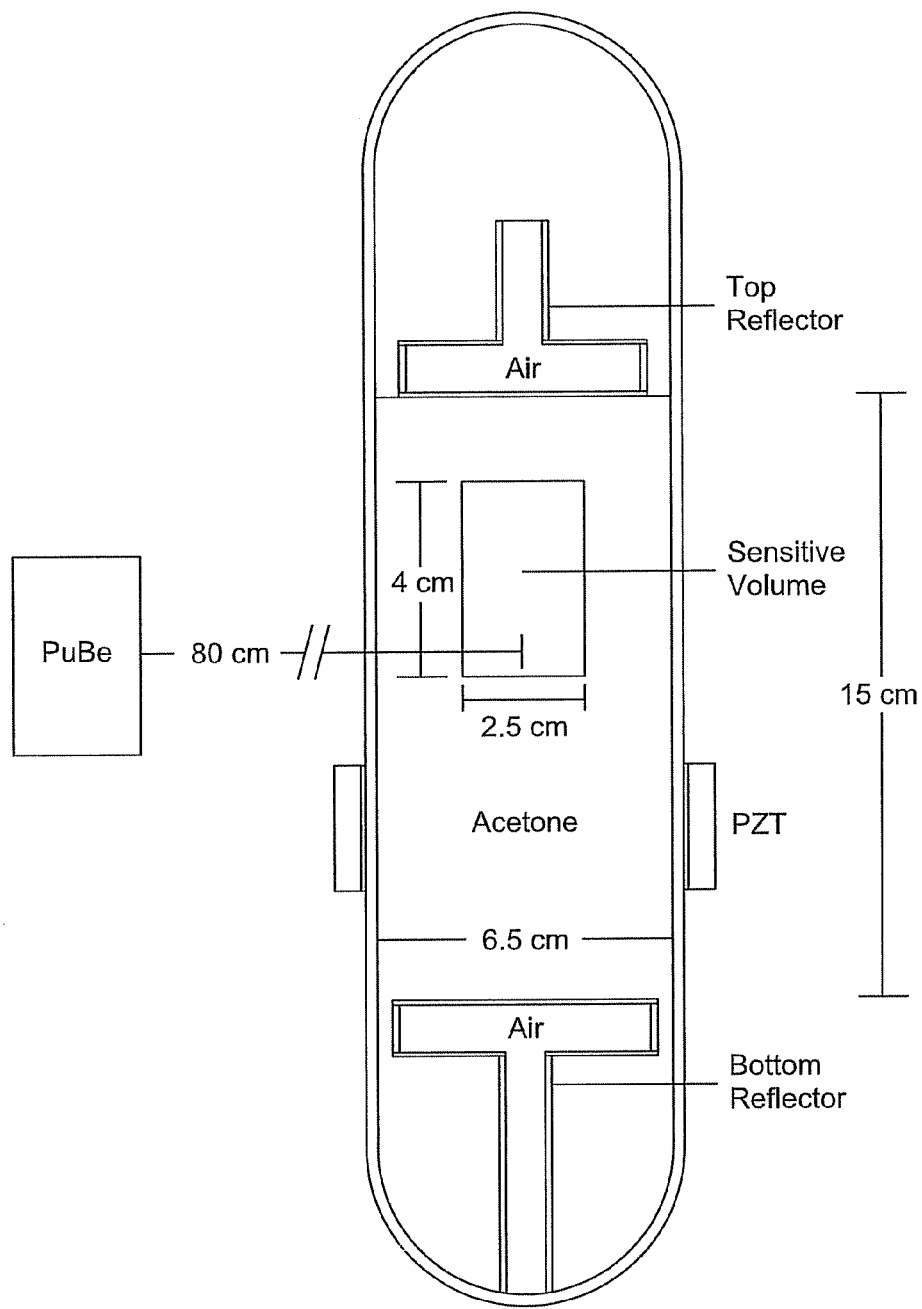
FIG. 7 illustrates a regional sensitive volume in the detector fluid defined as the region of the detector fluid where the tension levels were below 3.5 bar.

A regional sensitive volume was defined in the detector fluid as seen in FIG. 7. The sensitive volume of the detector is modeled as a right circular cylinder (r=1.25 cm and h=4 cm). The sensitive volume in the detector was defined as the region of the detector fluid where the tension levels are below 3.5 bar, which is the threshold for detection of a neutron having about 4 MeV of energy. The size and location of the sensitive volume chosen was based on direct experimental evidence and COMSOL MULTIPHYSICS® based theoretical modeling as described in J. Wang et al. Nuclear Engineering and Design (2010) 240, 3716-3726. The cylinder formed the neutron tally volume for simulations. The neutron energy spectrum for a bare Pu—Be source was used and all nuclear cross sections were evaluated at 300° K. The modeled geometry is illustrated in FIG. 7.

The PoliMi code package of the MCNP suite was used to model the actual interaction-induced energy transfer mechanisms in the detector fluid of the ATMFD. The location of neutron elastic scatter events in which greater than about 100 keV was deposited onto a carbon or oxygen atom that occurred in the sensitive volume of the detector was tallied and utilized for resolution studies. The current tension levels utilized for this study (up to about −10 bar) were not sufficient to detect the recoil of protons due to their significantly lower dE/dx, and therefore all neutron elastic scatter interactions with hydrogen were not counted. It is noteworthy that unlike for superheated states, a credible theoretical model of the underlying physics for nucleation mechanisms in "tensioned" metastable fluids is not yet available. The threshold value of 100 keV chosen for this study is based on actual empirical experimentation using dissolved isotopes such as 238 Pu and 241 Am for which the about 5.5 MeV alpha decay caused recoil nuclei energies are well-known to be about 80-100 keV.

Validation of the MCNP-PoliMi model was performed by running the simulation until 2,000 neutron detection events occurred in the sensitive volume of the detector. The neutron detection event locations were then analyzed with the stochastic model discussed previously to predict directional information. The MCNP-PoliMi simulation results are superimposed in FIG. 4 for comparison with the experimental data. The simulated data analyzed with the stochastic model determined the neutron source to be located at an angle of −5.9° with an angular resolution of ±7.7° with a confidence level of 68% and within ±15.1° with a confidence level of 95%. As can be seen the MCNP-PoliMi simulation corresponds well with experimental data.

Figure 8:
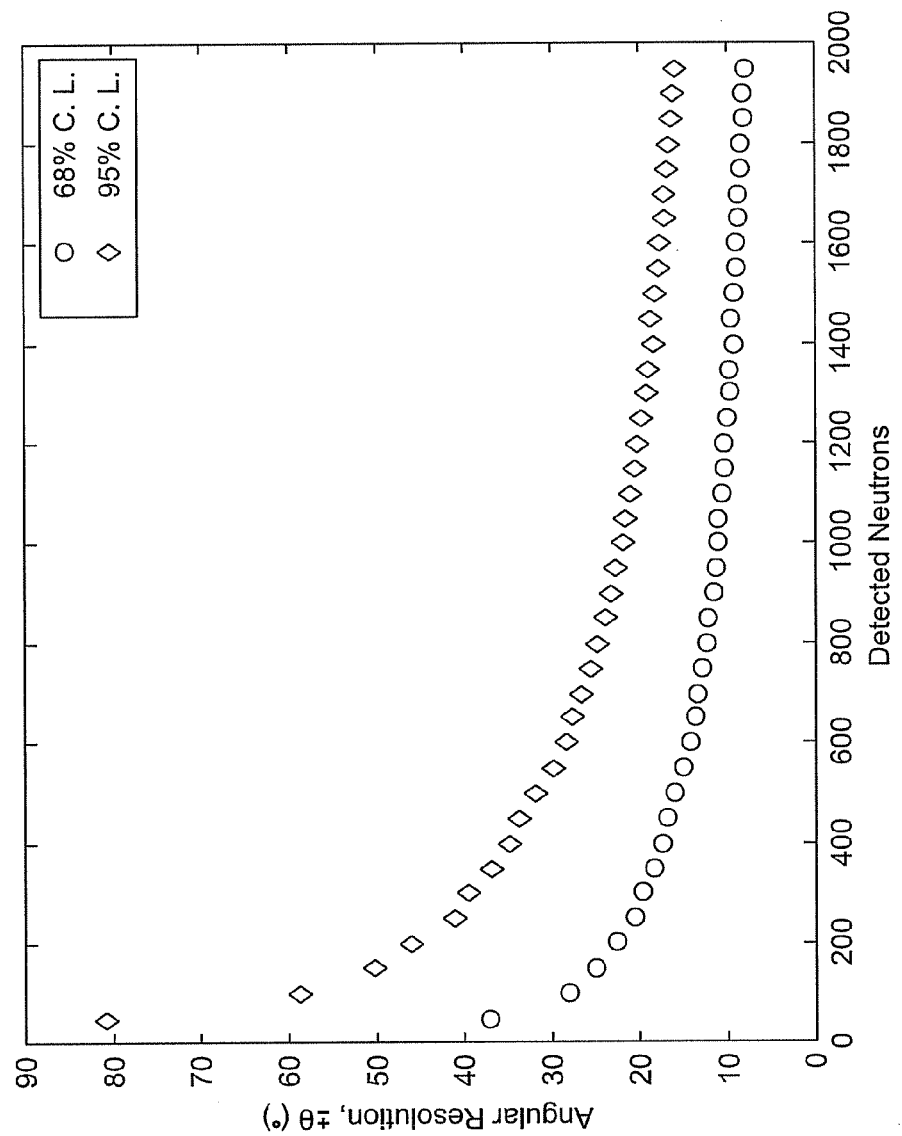
FIG. 8 illustrates the performance of the directional ATMFD system as a function of detected neutrons.

The amount of directional information attainable is a function of the solid angle, the macroscopic cross section, and the sensitive volume size. In order to simulate the performance of the directional ATMFD system, the MCNP-PoliMi model was also utilized to assess directional detection of a SNM at a greater distance. A 252-Cf fission spectrum-based neutron source was used to simulate a SNM source at a distance of 500 cm. The distance of 500 cm was chosen to ensure that solid angle effects become negligible, and thus, to better assess detector performance at large distances. MCNP-PoliMi simulations were run until 2,000 neutron detection events occurred in the sensitive volume of the detector and the angular resolution at 68% and 95% confidence levels was calculated as a function of the number of detection events. The results are shown in FIG. 8.

This experiment illustrated that the accuracy of direction information improves with additional detection events.

ATMFD System Scaling for Optimal Directionality Information

In an ATMFD, the size of the sensitive volume directly influences both the amount of directional information ascertainable and the efficiency of detection. A robust, multi-physics based design and simulation framework accounting for multi-dimensional phenomena in conjunction with acoustics, thermal hydraulics, mechanics of structures and electromagnetic coupling was set up to model the pressure fluctuations and associated detection locations occurring within the ATMFD system. The simulation-tool used in the characterization of the ATMFD system was COMSOL MULTIPHYSICS® Version 3.3, 2006. Because exact analytical solutions for wave transport in three dimensional sets cannot be readily obtained for this complex problem, the model utilized finite element methods to solve the problem in the frequency domain. The ATMFD system was modeled as an axi-symmetric body. The detector fluid used in the model was pure acetone at 300 oK. FIG. 9 provides a visual representation of the relationship between variations in the drive power applied to the PZT and the spatial characteristics of the sensitive volume of the chamber at the resonant frequency of 18.78 kHz. Ethylene glycol and acetone as the host liquids have been modeled previously and shown to be predictive of actual experimental data for the transient pressure distribution and frequency spectra response.

In the current detector configuration, the sensitive volume of the chamber can be defined as the volume of the chamber in which the oscillating negative pressure fluctuations are at or below −3.5 bar, which has been found to be the threshold negative pressure for detection of fast (about 4 MeV on average) neutrons from a Pu—Be neutron source in acetone at 300 K within 60 seconds. The simulations show that the size of the sensitive volume (and consequently the radius) is directly related to the input power of the ATMFD resonant chamber. It has been shown that a modest (40%) increase in drive power from 4 W to 5.5 W resulted in an increase of the sensitive volume (by about 75%) from about 20 cm$^3$ to about 35 cm$^3$. It is believed that this can be explained on the basis that higher the negative pressure amplitudes in the liquid increase the probability that a neutron induced nucleation event will occur (since <4 MeV neutrons can also lead to detection events). The pressure field inside the chamber corresponds with the distribution density and profile of the actually measured neutron-induced bubble nucleation sites. Experimentation was performed with acetone as the detector fluid and with the Pu—Be source −20.3 cm and 20.3 cm from the center of the chamber on axis with the PZT transducers (Mic 1 and Mic 3) to prevent the directional nature of the detector from becoming a factor. The positions of the detection event sites were plotted in the RZ plane and overlaid on top of the sensitive volume pressure field predicted by the COMSOL MULTIPHYSICS® model. The results are included in FIG. 9 for comparison. Analysis of the results show that the neutron induced detection events primarily occurred at pressures lower than −4 bar, which correlates well with the previously measured detection threshold of −3.5 bar for fast neutrons detected in acetone at 300° K. The excellent correlation between both experimental and theoretical results validates both the experimental determination of the location of the neutron detection events by the TMFD system and the COMSOL MULTIPHYSICS® numerically based mathematical simulation methodology.

Additional modeling was used to quantify the effects of increased sensitive volume size on the amount of directionality information attainable. MCNP-PoliMi simulations were performed with various sensitive volume (SV) sizes ranging from R=0.5 cm to R=3.0 cm with a fixed H=4.0 cm from which the angular resolution at 68% and 95% confidence levels with the acquisition of only 500 neutron induced events were calculated. The results are shown below in FIG. 10.

FIG. 10 illustrates that as the radius of the sensitive volume increases the angular resolution rapidly approaches the maximum possible angular resolution of 0° with the same total number of neutron detection events recorded.

The relationship between detection efficiency and angular resolution was also investigated. MCNP-PoliMi simulations were performed for each sensitive volume size. The number of source neutrons in each case was that used to obtain 500 valid detection events for the baseline sensitive volume size of R=1.25 cm. The height was kept the same for each case, although, in reality the height of the sensitive volume also increases. The increased efficiency was found to (quadratically) increase the number of detection events recorded in the ATMFD chamber for the same number of source neutrons. For example, with R=3 cm the detection events for the same number of source neutrons increased from 500 to about 2,991. This result scales with the square of the radii (i.e., $(3/1.25)^2 \times 500 = 2,880$). The results are shown below in FIG. 11.

As the radius of the sensitive volume increases, the angular resolution achieved approaches the maximum angular resolution of 0° significantly faster because of the increased sensitive volume size and improved detection efficiency. These results further confirm that the directional capabilities of the detector may be readily enhanced by increasing the sensitive volume size.

Directional fast neutron detection is particularly useful for portal monitoring (e.g. vehicles and cargo) and wide-area searches. Such applications are typically signal-starved environments due to necessary standoffs, intervening materials, and measurement protocols imposed on verification regimes. The scalability of detector size is essential in these instances. For example, as defined by the International Atomic Energy Agency (IAEA), 8 kg is considered to represent a threshold for a "significant quantity" of plutonium. In general, the neutron emission rate from 8 kg of Pu varies based on size, composition and burnup. For example, calculations based on spontaneous fission alone show that weapons grade Pu (90% 239 Pu and 6% 240 Pu) emits about 60,000 neutrons/(s kg). However, if the weapons grade plutonium (WGP) was assembled as a metal sphere absorption and multiplication effects must also be considered. One such benchmark defined by Kouzes et. al. calculated that just a 4-kg sphere of WGP would emit about 106 neutrons/s, a figure nearly 4 times larger than that from spontaneous fission alone. See Nuclear Instruments and Methods in Physics Research (2008) 584: 383-400. Additionally, the source of the plutonium must be considered as well. A reactor used specifically for creating WGP would utilize very low burnup to avoid the buildup of higher isotopes of plutonium. These low burnups are very inefficient for power production, but ideal for producing WGP. On the contrary, plutonium extracted from the spent fuel of commercial light-water and CANDU reactors under long term irradiation develop much higher concentrations of 240 Pu. Due to the higher concentrations of 240 Pu, reactor grade plutonium (RGP) typically emits about 500,000 neutrons/(s kg) from spontaneous fission alone (or about 8 times higher than from WGP).

For example, at a distance of 25 m, two times the length of a typical 40 ft sea container, the neutron rate from 8 kg of RGP (in non-spherical geometry) arriving into an ATMFD detector with sensitive volume (radius of 3 cm and height of 10 cm) is about $$\frac{4 \times 10^6}{4\Pi 2500^2} \times 60 \text{ cm}^2 = 3.0 n/s$$

Therefore, the ATMFD could theoretically be made capable of locating a 8 kg mass of RGP to within 11.2° with a 68% confidence in only 1 min (and in less time if the RGP were to be in a spherical configuration). Additionally, as more neutron counts are accumulated, the angular resolution is enhanced resulting in a significant reduction of the search space when compared to a non-directional detector. Results based on MCNP-PoliMi simulations are tabulated in Table 1.

TABLE 1

Time to detect an 8 kg mass of RGP 407 at 25 m to a specified angular resolution. Calculated from MCNP-PoliMi assessments with a SV of r = 3.0 cm and h = 10 cm.

| Time to detect | Angular Resolution, ±θ° |
|---|---|
| 20 sec | 18.9° |
| 40 sec | 13.6° |
| 60 sec | 11.2° |
| 120 sec | 8.1 |

ATMFD Based Neutron Source Spatial Imaging

One of the unique applications of directional neutron detectors is the capability to image the actual location of a neutron source. Ascertaining the location of the neutron source would allow for the determination of both the source shape, size and (in combination with known detection efficiency) the neutron source strength. Imaging detectors have the potential to play an important role in non-proliferation type applications. Just a few examples include: the external monitoring of a storage facility where the location and movement of SNM may be of interest, counting spent-fuel assemblies in a safeguarded regime, determining an SNM mass for material accounting, or counting warheads as part of a verification protocol.

Imaging of the neutron source location is typically accomplished by utilizing multiple banks of detectors at known locations each measuring the neutron source at different angles. The difference between the measured directions as measured by a series of detectors in conjunction with the detector locations allows for triangulation of the location of the neutron source. Experimentation was performed to investigate for these exciting capabilities of the ATMFD system. Two ATMFD detectors were placed at a separation of 25 cm. The XY coordinate system was defined such that the detectors were located at (0 cm, 0 cm) and (25 cm, 0 cm). A 1 Ci Pu—Be neutron source was placed at (15 cm, −20 cm) and data were recorded for approximately 10 min. (at an acquisition rate of 3 Hz) resulting in the collection of a total of 2000 neutron detection events. The neutron detection event locations were then analyzed with the stochastic model developed above to calculate the total probability distribution function for each detector. A 2D mesh was created covering an experimental area of 5,625 cm$^2$. The angle with respect to each detector was calculated at each grid location and the corresponding probability was calculated. The results are shown in FIG. 12. The neutron source was determined to be located at the most probable location at (17.1 cm, −15.2 cm). The confidence level was calculated by integrating the area under the surface and was found to cover an area of 304.8 cm$^2$ at 68% confidence.

Verification of the experimental results was done by utilizing the MCNP-PoliMi model. The experimental conditions were replicated in the model, and simulations were run until 2000 simulated neutron detection events occurred in the sensitive volume of the detectors. The results are shown in FIG. 13. The neutron source was determined to be located at the most probable location at (17.6 cm, −17.5 cm). The confidence level was calculated by integrating the area under the surface and was found to cover an area of 146 cm$^2$ at 68% confidence.

Interestingly, both MCNP-PoliMi simulations and experimental data resulted in nearly identical neutron source locations, but calculated an area nearly half of the experimentally measured area at 68% confidence. It is hypothesized that the poor spatial resolution in the experimental data is most likely due to neutron albedo effects from the additional biological shielding present in the experimental setup, but omitted for the 3-D MCNP-PoliMi simulations.

A prototype directional fast neutron detector based on tensioned metastable fluids was designed, constructed, characterized, and validated. Experimental evidence has shown that the directional ATMFD system in its current configuration is capable of locating the direction of a 1 Ci Pu—Be neutron source to within 16.2° with 95% confidence; this required about 2,000 detection events which could be collected within about 200 s at a detection rate of about 10 per second. MCNP-PoliMi based assessments presented significant improvements in angular resolution with increased sensitive volume size resulting in enhanced directional information and total detection efficiency. Application to the detection of SNM fission neutrons at a large standoff (about 25 m) illustrated the ability to detect a significant quantity of 8 kg of RGP to within 11.2° with a 68% confidence in only 1 min. Using two ATMFDs allows for neutron source imaging, an aspect which was experimentally validated, and benchmarked with theoretical simulations.

Also envisioned are ATMFD geometries capable of ascertaining directionality in 4π as well as the use of trimethyl borate as detector fluid for directional detection of both unshielded and shielded SNMs in the same detector system.

The systems described herein can be used to monitor SNM storage facilities and for material accountability safeguards applications in reprocessing facilities. For portal monitoring and monitoring in virtually any situation where SNM materials may be located.

All patents, patent applications, and published references cited herein are hereby incorporated by reference in their entirety. While this invention has been particularly shown and described with references to preferred embodiments thereof, it will be understood by those skilled in the art that various changes in form and details may be made therein without departing from the scope of the invention encompassed by the appended claims.

Example 1

An ATMFD system having a detection chamber with a 6 cm×10 cm cross-sectional area) is capable of detecting a 8 kg Pu source at 25 m with a resolution of 11.2°, with 68% confidence within 60 s. In this example, a new ATMFD sensor system capable of ascertaining directionality in 4π fields is described. Characterization and validation of the ATMFD system in cylindrical and spherical geometries includes Monte-Carlo based nuclear particle transport assessments using MCNP-PoliMi and multi-physics accounting for acoustic, structural, and electromagnetic coupling of the ATMFD system via COMSOL's multi-physics platform. Experimental verification of MCNP-PoliMi of ATMFD performance for 3-D directionality and direct source imaging/positioning are also demonstrated. Methodologies based on geo-positioning-scheme (GPS) and a higher harmonic based schemes are also described. The spherical (higher-harmonic) technology provides for rapid (within tens of seconds) direct visualization based directionality of incoming neutron radiation via line-of-sight tracks effectively comprising multiple single detectors within the envelope of a single spherical ATMFD. Detection transducers can also be used.

The acoustic tension metastable fluid detector chamber employed for this study consisted of about 70 mm OD and 150 mm long cylindrical quartz tube with a wall thickness of about 3 mm. The current experimental setup utilized a detector fluid of 99.5% pure acetone ($C_3H_6O$) at 22° C. and under 558 mmHg of vacuum. A schematic of the experimental ATMFD test section used is shown in FIG. 1. A concentrically affixed ring shaped piezoelectric ceramic transducer attached to the outside of the chamber and is used to power the acoustic resonance chamber. A sinusoidal signal amplified by a linear amplifier drives the PZT transducer which is polarized in the radial direction. When in resonance, a standing acoustic wave forms consisting of oscillating positive and negative pressures in the about 18 kHz range. During the time the fluid molecules are under tension, the state is metastable whereupon, neutron direct knock-on strikes may be monitored by the formation of transient bubbles. Four about 7 mm OD MHz response piezoelectric transducers which are affixed to the outside of the resonant chamber are used to record shock traces generated by the violent release of stored energy occurring immediately following a neutron detection event. The time difference of arrival of the shock traces at each transducer is measured and analyzed with a hyperbolic positioning algorithm to calculate the 3-D location of the neutron detection event in the detector chamber. The time difference of arrivals of the shock traces is recorded utilizing a digital storage oscilloscope controlled by a LabVIEW™ based virtual instrument. Data collection, signal processing and analysis are performed in near real time (i.e., within milliseconds).

Directional information is ascertainable in the ATMFD system due to the increased probability that a neutron induced detection event will occur in the region of the sensitive volume nearest the source. The probability that a neutron induced detection event will occur is a function of the negative pressure in the detector fluid and the neutron flux. Due to the chiefly axi-symmetric nature of the construction of the cylindrical ATMFD resonant chamber, the probability of a neutron detection event can be simplified by treating it to be a function of the neutron flux alone. This postulate has been validated experimentally and also theoretically via COMSOL Multiphysics™ based multi-dimensional modeling simulations. Such uncoupling of the dependence of the probability of a neutron detection event with the negative pressure allows quantitation of directional information with respect to the location of the neutron source in $2\pi$ based solely on the magnitude and energy of the neutron flux. Since neutron flux from a source decreases with distance and with the degree of down scattering and absorption, the side of the sensitive volume nearest the source naturally has the highest probability of interaction locations, and therefore, for the formation of transient bubbles. Detecting the location of these events inside the detector provides the directional information of the neutron source. This was accomplished via a stochastic model based on the neutron attenuation law to estimate the probability, P, that a detected neutron had traversed a distance, d, ill the detector fluid without interacting and then interacting within the distance $\delta d$ as per the following expression:

$$P(d,\delta d) = P_{non\text{-}reaction}(d) * P_{reaction}(\delta d)$$

The distance, d, from any position in the detector to the wall of the detector in the direction, $\theta$, is derived as $$d = r\cos(\theta + \pi - \theta_0) \pm \sqrt{r^2 \cos^2(\theta + \pi - \theta_0) - r^2 + R^2}$$

where (r, $\theta$0) is the detection location (as defined in a 2-D polar coordinate system) and R is the radius of the detector. Therefore the probability that the neutron originated from the direction, $\theta$, and interacted at the detection location is given by $$P(\theta) = e^{-\Sigma d}(1 - e^{-\Sigma \delta d})$$

where $\delta d$ is the spatial resolution of the detector (found to be about 0.1 mm). Each individual neutron detection event probability distribution is then normalized, and the total probability distribution of n detection events is calculated as $$P_{Tot}(\theta) = \prod_{i=1}^{n} P_i(\theta)$$

Previous experimental results have shown that the ATMFD system is capable of locating the direction of a 1 Ci Pu—Be neutron source to within 8.1° with 68% confidence within about 200 s (i.e., for a 1 Ci Pu—Be neutron source at a distance of 80 cm). This represents a substantial reduction (22×) in the search space when compared to a non-imaging detector. Additional experiments performed at various pointing angles of −180°, −90°, 0° and 90° verified that the angular resolution is uniform and independent of source positioning as well.

$4\pi$ Directional Detection

Analogous to the stochastic model developed to ascertain directionality in $2\pi$, the neutron attenuation law may be utilized to estimate the probability that a detected neutron had originated from any given direction (in $4\pi$) based on the detection location.

Figure 2:
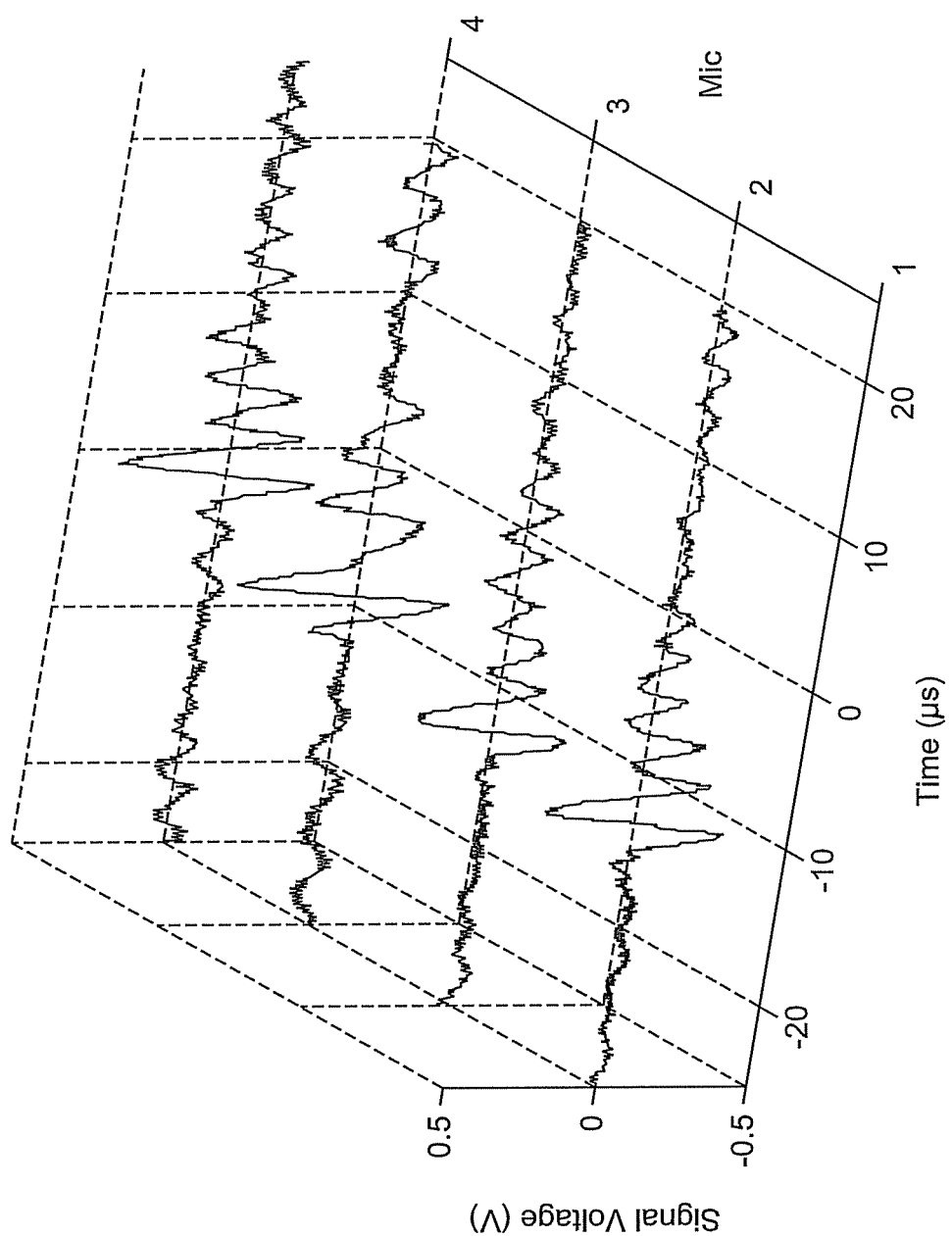

Utilizing the 3-D polar coordinate system shown in FIG. 2, the distance, D, between the detection location and the wall of the detector in any direction, ($\theta$, $\phi$), is derived as $$D = \sqrt{d^2 + z^2}$$

where d is the distance from any position in the detector to the wall of the detector in the direction, $\theta$, and z is given by $$z = d \tan \phi$$

The top, T, and bottom, B, of the detector are accounted for by applying the following rules:

if $z + z_0 > B$, then $z = T - z_0$ if $z + z_0 < B$, then $z = B - z_0$

Therefore the probability that the neutron originated from the polar angle, $\theta$, and the azimuthal angle, $\phi$, and interacted at the position (r, $\theta_0$, $z_0$) is given by $$P(\theta, \phi) = e^{-\Sigma D}(1 - e^{-\Sigma \delta D})$$

where $\delta D$ is the spatial resolution of the detector. Each individual neutron detection event probability distribution is then normalized, and the total probability distribution of n detection events is calculated as $$P_{total}(\theta, \varphi) = \prod_{i=1}^{n} P_i(\theta, \varphi)$$

Characterization of the $4\pi$ directional performance of the ATMFD system was done utilizing Monte-Carlo based nuclear particle transport using MCNP-PoliMi. The MCNP-PoliMi model utilized incorporates all of the main features of the ATMFD system including the actual interaction-induced energy transfer mechanisms in the detector fluid. The sensitive volume of the ATMFD was modeled as a right circular cylinder (r=1.5 cm and h=5 cm). The sensitive volume of the detector is defined as the region of detector fluid where the tension levels are below 3.5 bar, which is the threshold for detection of about 4 MeV neutron. The size and location of the sensitive volume chosen was based on direct experimental evidence and COMSOL Multiphysics™ based modeling.

The MCNP-PoliMi model utilized for this study has been previously used to simulate the $2\pi$ directional performance of the ATMFD system and has been experimentally confirmed.

Assessments were performed to investigate the angular resolution as a function of azimuthal angle, $\phi$. It is clear from the stochastic model that the angular resolution with respect to the polar angle, $\theta$, is identical to the $2\pi$ case, and therefore assessments of the angular resolution with respect to the polar angle were not performed. The MCNP-PoliMi model was modified to include a Pu—Be neutron source located at a distance of 1 m at a polar angle of 0° and azimuthal angles of −90°, −45°, 45°, and 90°. The simulation was run until 2000 neutron detection events occurred in the sensitive volume of the detector. The neutron detection event locations were then analyzed with the stochastic model to calculate the source probability distribution in $4\pi$ and the resultant angular resolution. Analysis of the results indicated that the pointing accuracy of the cylindrical ATMFD system with respect to azimuthal angles was very poor when the neutron source was located at non-zero azimuthal angles. The predicted azimuthal angle in all cases was approximately 0°. The poor performance of the stochastic model in the azimuthal angles is due to the asymmetry of the cylindrical ATMFD with respect to azimuthal angles. Due to the geometry of the cylindrical ATMFD, neutrons incident at an azimuthal angle of 0° travel through the least amount of detector fluid before reaching the sensitive volume, and therefore the stochastic model predicts that any neutron detection events recorded are most likely to have originated from an azimuthal angle of 0°.

To solve the problems in obtaining $4\pi$ directionality two cylindrical ATMFD systems with different orientations can be used. Due to the radial symmetry of the cylindrical ATMFD, the angular resolution in $2\pi$ was found to be uniform, therefore one detector may be oriented vertically to obtain information on the polar angle, and one detector may be oriented horizontally to obtain information on the azimuthal angle. Alternatively, a spherical ATMFD has been developed that would exhibit symmetry in both polar and azimuthal angles. The symmetrical construction of this system allows for the uncoupling of the dependence of the probability of a neutron detection event with the negative pressure, therefore allowing us to quantify the ability of the ATMFD system to ascertain directionality in $4\pi$.

Two Element Cylindrical ATMFD Geometry $4\pi$ Directional Detector

Two cylindrical ATMFD systems (identical in construction and design to the ATMFD utilized for $2\pi$ studies) are utilized for the development of the $4\pi$ directional neutron detector system. One of the cylindrical ATMFD detectors is oriented vertically to obtain information on the polar angle, and the other cylindrical ATMFD detector is oriented horizontally to obtain information on the azimuthal angle. The horizontally oriented detector is located directly below the vertically oriented detector and centered horizontally as shown in FIG. 14. The same stochastic model developed for $2\pi$ directionality determination is used for analysis of the detection event locations in each detector, and the resulting $4\pi$ source direction probability is then calculated.

Spherical ATMFD Geometry $4\pi$ Directional Detector

A schematic diagram of the spherical ATMFD system is shown in FIG. 15. The resonant acoustic chamber consists of a spherical chamber about 12.5 cm in diameter with a wall thickness of about 3 mm. Two about 2.5 cm diameter disc piezoelectric ceramic transducers were affixed to the outside of the chamber and were used to power the acoustic resonant chamber.

As before, a sinusoidal signal amplified by a linear amplifier drives the PZT transducers which are polarized in the radial direction. When in resonance at about 83 kHz the mechanical deformation of the flask generates a standing wave consisting of multiple oscillating positive and negative pressures. Additionally, a disc PZT having a diameter of about 7 mm was affixed to the outside of the chamber and was used to monitor for bubble implosion events caused by incident neutrons.

Analogous to the stochastic model developed to ascertain directionality in $4\pi$ in the cylindrical ATMFD, directionality in the spherical ATMFD was obtained by calculating the probability that the neutron originated from the polar angle, $\theta$, and the azimuthal angle, $\phi$, and traversed the distance, D, in the detector fluid without interacting, and then interacted within the distance $\delta D$ of the position $(x_0, y_0, z_0)$ as given by $P(\theta, \phi) = e^{-\Sigma \delta D}(1 - e^{-\Sigma \delta D})$. The distance, D, from any position in the detector to the wall of the detector, as defined in the spherical coordinate system shown in FIG. 16 is as follows:

$$D = -a_2 + \sqrt{a_2^2 - a_3}$$

where $a_2$ and $a_3$ are defined as $$a_2 = 2x0 \sin\phi \cos\theta + 2y0 \sin\phi \sin\theta + 2z0 \cos\phi$$

and $$a_3 = x_0^2 + y_0^2 + z_0^2 - R^2$$

respectively. As before, each individual neutron detection event probability distribution is then normalized, and the total probability distribution of n detection events is calculated using the following equation:

$$P_{total}(\theta, \varphi) = \prod_{i=1}^{n} P_i(\theta, \varphi)$$

MCNP-PoliMi assessments were performed to investigate the two element cylindrical ATMFD design. A PuBe neutron source was modeled at a distance of 80 cm located at a polar angle of 0° and an azimuthal angle of 0°. A sensitive volume of r=1.5 cm and h=5 cm was used for each detector element. Simulations were run until a total of 2000 neutron detection events occurred in the sensitive volumes of the detectors. The neutron detection event locations were then analyzed with the stochastic model to ascertain directional information.

The results show that the proposed two element cylindrical ATMFD system is capable of locating the direction of a neutron source to within 0.358 steradians with 68% C.L. with the acquisition of 2000 detection events. This represents a 35-fold reduction in the search space when compared to a non-imaging detector.

MCNP-PoliMi assessments were performed to investigate the spherical ATMFD design. A PuBe neutron source was modeled at a distance of 80 cm located at a polar angle of 0° and an azimuthal angle of 0°. A sensitive volume of r=3.0 cm was used. Simulations were run until 2000 neutron detection events occurred in the sensitive volume of the detector. The neutron detection event locations were then analyzed with the stochastic model to ascertain directional information.

The results show that the proposed spherical ATMFD system will be capable of locating the direction of a neutron source to within 0.018 steradians with 68% C.L. with the acquisition of 2000 detection events. This represents a substantial reduction in angular resolution when compared to the two element cylindrical ATMFD system, and illustrates the potential benefits of scaling the detector size (i.e r=1.5 cm vs. r=3 cm).

In theory the angular resolution of the detector should be uniform at all pointing angles due to the spherical symmetry of the ATMFD detector. Assessments were performed with the Pu—Be neutron source located at polar angles of −180°, −90°, and 90° and the angular resolution was found to be uniform with respect to polar angle. Assessments were also performed with the Pu—Be neutron source located at azimuthal angles of −90°, −45°, 45° and 90° and the angular resolution was found to be uniform with respect to azimuthal angle. In addition, by virtue of the fact that the spherical ATMFD is operated at a 10-fold higher harmonic frequency, the single system effectively encompasses a collection of multiple ATMFDs within the overall enclosure—with multiple zones of nodes and antinodes. This provides a radically simple methodology for ascertaining directionality by noting the track of bubbles that form within the enclosure at various pressure antinodes. Line of sight pointing to the Pu—Be neutron source is clear and, effectively, within seconds of visual imaging it is now possible to ascertain directionality of incoming neutron radiation without resort to GPS algorithm based mathematics.

This example has demonstrated separate ATMFD systems that are capable of ascertaining 4π directional information on the location of fast neutron sources. A two element cylindrical ATMFD system based on the current ATMFD design capable of ascertaining 2π directional information was designed and shown capable of locating the direction of a neutron source to within 0.358 steradians with 68% C.L.

A spherical ATMFD was designed that is capable of locating the direction of a neutron source to within 0.018 steradians with 68% C.L.

The invention claimed is:

1. A neutron detection system for determining the direction of the source of incident neutron radiation comprising a microprocessor and a detecting chamber system containing at least two axis of symmetry containing a fluid configured with a plurality of detecting transducers for detecting bubbles within the chamber system and acoustic transducers for establishing acoustically tensioned metastable state within the liquid in the chamber system that is radially symmetric along the at least two axis of symmetry; the detecting transducers being configured with the chamber system to receive signals obtained from bubbles in the chamber system and transmit them to a microprocessor, the signals being sufficient to allow the microprocessor configured with an algorithm for determining the three dimensional position of the bubbles in the chamber system to determine the position of bubbles within the chamber; the acoustic transducers being configured with the chamber system to introduce a sound wave into the liquid in the chamber system sufficient to introduce an acoustic metastable state in the liquid sufficient to nucleate bubbles upon exposure to incident neutron radiation, the acoustic metastable state being introduced in response to a signal from a microprocessor; and a microprocessor for identifying in 4π the direction of the source of incident neutron radiation from bubble signals generated within the chamber system.

2. The neutron detection system of claim 1, wherein the microprocessor for identifying the direction of the source of the incident neutron radiation determines the track of the bubbles through chamber fluid, the origin of the bubbles being in the direction of the source of the neutron radiation.

3. The neutron detection system of claim 1, wherein the microprocessor for identifying the direction of the source of the incident neutron radiation determines the density of bubble events within the chamber fluid, the denser portion of the gradient being in the direction of the source of the neutron radiation.

4. The neutron detection system of claim 1, wherein the chamber system is spherical and the direction is in three dimensions.

5. The neutron detection system of claim 1, wherein the chamber system comprises at least two chambers and the direction is in three dimensions.

6. The neutron detection system of claim 1, further comprising at least four detecting transducers.

7. The neutron detection system of claim 1, wherein the device is insensitive to gamma photons.

8. The neutron detection system of claim 1, wherein the device is insensitive to gamma photons and non-neutron cosmic background radiation.

9. The neutron detection system of claim 1, further comprising quartz reflectors.

10. The neutron detection system of claim 1, wherein at least one of the acoustic transducers is a piezoelectric transducer.

11. The neutron detection system of claim 1, wherein at least one acoustic transducer is a piezoelectric ceramic transducer.

12. The neutron detection system of claim 1, wherein the chamber system further includes a linear amplifier for sending the acoustic signal to the acoustic transducers.

13. The neutron detection system of claim 1, wherein the chamber system further includes a linear amplifier for sending the acoustic signal to the acoustic transducers, the signal being a sinusoidal sound wave with respect to the liquid in the chamber.

14. A method for determining the direction of incident radiation comprising obtaining a neutron detection system of claim 1, applying an acoustic sound wave to induce tension in the fluid such that incident neutron radiation causes a bubble within the fluid, detecting bubbles within the chamber system, and determining the direction of the source of a neutron emitting radiation source.

15. The method for determining the direction of incident radiation of claim 14, wherein the method comprises obtaining a single chamber system.

16. The method for determining the direction of incident radiation of claim 14, wherein the method comprises obtaining a multiple chamber system.

17. The method for determining the direction of incident radiation of claim 14, wherein the event is an audible sound produced by a bubble.

* * * * *

UNITED STATES PATENT AND TRADEMARK OFFICE
CERTIFICATE OF CORRECTION

| | | |
|---|---|---|
| PATENT NO. | : 9,348,039 B2 | |
| APPLICATION NO. | : 14/365199 | |
| DATED | : May 24, 2016 | |
| INVENTOR(S) | : Rusi P. Taleyarkhan et al. | |

It is certified that error appears in the above-identified patent and that said Letters Patent is hereby corrected as shown below:

IN THE SPECIFICATION

In Col. 18, line 17, delete "$P(\theta,\varphi)=e^{-\Sigma\delta D}$" and substitute therefor -- $P(\theta,\varphi)=e^{-\Sigma D}$ --

Signed and Sealed this
Nineteenth Day of July, 2016

Michelle K. Lee
*Director of the United States Patent and Trademark Office*